(12) United States Patent
Luo et al.

(10) Patent No.: US 11,187,071 B2
(45) Date of Patent: Nov. 30, 2021

(54) SYSTEMS AND METHODS FOR DETECTING A SUBSURFACE EVENT

(71) Applicant: CHEVRON U.S.A. INC., San Ramon, CA (US)

(72) Inventors: Yang Luo, San Ramon, CA (US); Leonard Lin Zhang, San Ramon, CA (US); Chaoshun Hu, San Ramon, CA (US); Chunling Wu, San Ramon, CA (US)

(73) Assignee: CHEVRON U.S.A. INC., San Ramon, CA (US)

(*) Notice: Subject to any disclaimer, the term of this patent is extended or adjusted under 35 U.S.C. 154(b) by 117 days.

(21) Appl. No.: 16/511,795

(22) Filed: Jul. 15, 2019

(65) Prior Publication Data
US 2020/0018149 A1    Jan. 16, 2020

Related U.S. Application Data

(60) Provisional application No. 62/698,685, filed on Jul. 16, 2018.

(51) Int. Cl.
*E21B 47/003* (2012.01)
*G01H 9/00* (2006.01)
(Continued)

(52) U.S. Cl.
CPC ............ *E21B 47/003* (2020.05); *E21B 47/09* (2013.01); *E21B 47/12* (2013.01); *G01H 9/004* (2013.01)

(58) Field of Classification Search
CPC .......... E21B 47/12; E21B 47/14; E21B 47/09; E21B 47/003; E21B 47/0025; E21B 47/002; G01H 9/004
See application file for complete search history.

(56) References Cited

U.S. PATENT DOCUMENTS

| | | | |
|---|---|---|---|
| 6,023,443 A * | 2/2000 | Dubinsky | E21B 43/08 367/76 |
| 6,424,464 B1 * | 7/2002 | Neff | G01V 1/34 345/419 |

(Continued)

OTHER PUBLICATIONS

International Search Report and Written Opinion in PCT/US2019/041837, dated Oct. 15, 2019.

(Continued)

*Primary Examiner* — Caroline N Butcher
(74) *Attorney, Agent, or Firm* — Sheppard, Mullin, Richter & Hampton LLP

(57) ABSTRACT

Systems and methods for estimating reservoir productivity as a function of position in a subsurface volume of interest are disclosed. The systems and methods may: obtain subsurface data and well data corresponding to a subsurface volume of interest; obtain a parameter model; use the subsurface data and the well data to generate multiple production parameter maps; apply the parameter model to the multiple production parameter maps to generate refined production parameter values; generate multiple refined production parameter graphs; display the multiple refined production parameter graphs; generate one or more user input options; receive a defined well design and the one or more user input options selected by a user to generate limited production parameter values; generate a representation of estimated reservoir productivity as a function of position in the subsurface volume of interest using the defined well design and visual effects; and display the representation.

20 Claims, 26 Drawing Sheets

(51) Int. Cl.
*E21B 47/12* (2012.01)
*E21B 47/09* (2012.01)

(56) References Cited

U.S. PATENT DOCUMENTS

| | | | | |
|---|---|---|---|---|
| 6,625,541 | B1* | 9/2003 | Shenoy | G01V 1/288 |
| | | | | 702/6 |
| 9,075,163 | B2* | 7/2015 | Robertsson | G01V 1/366 |
| 2011/0286306 | A1* | 11/2011 | Eisner | G01V 1/008 |
| | | | | 367/47 |
| 2013/0215717 | A1* | 8/2013 | Hofland | G01V 1/288 |
| | | | | 367/59 |
| 2015/0185344 | A1 | 7/2015 | Bardainne | |
| 2017/0307771 | A1* | 10/2017 | Brandsaeter | G01V 1/24 |

OTHER PUBLICATIONS

Artman et al., "Source location using time-reverse imaging", Geophysical Prospecting 58 (2010), 861-873.

Gelius et al., "High-resolution imaging of diffractions—A window-steered MUSIC approach", Geophysics, vol. 78, No. 6 (2013), S255-S264.

Grandi et al., "Microseismic event location by cross-correlation migration of surface array data for permanent reservoir monitoring", 71st EAGE Conference & Exhibition (Jun. 8-11, 2009), 5 pages.

Grigoli et al., "Automated microseismic event location using master-event waveform stacking", Nature (2016) Scientific Reports, 6:25744, DOI: 10.1038/srep25744, 13 pages.

Nakata et al., "Reverse time migration for microseismic sources using the geometric mean as an imaging condition", Geophysics, vol. 81, No. 2 (2016), P KS51-KS60, 14 pages.

Schmidt, "Multiple emitter location and signal parameter estimation", IEEE Transactions on Antennas and Propagation vol. AP-34, No. 3 (1986), 5 pages.

Schuster et al., "Interferometric/daylight seismic imaging", Geophysical Journal International 157 (2004), p. 838-852.

Sun et al., "Investigating the possibility of locating microseismic sources using distributed sensor networks", SEG annual meeting (2015), DOI http://dx.doi.org/10.1190/segam2015-5888848.1; 6 pages.

* cited by examiner

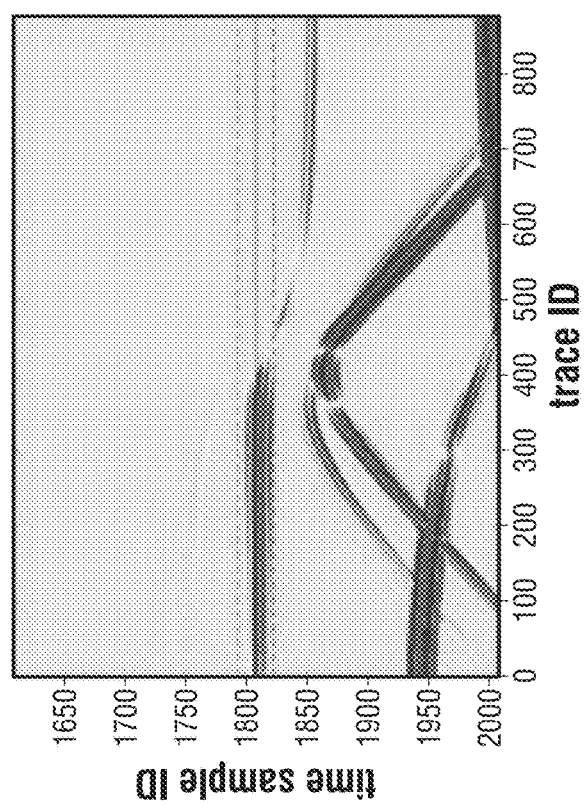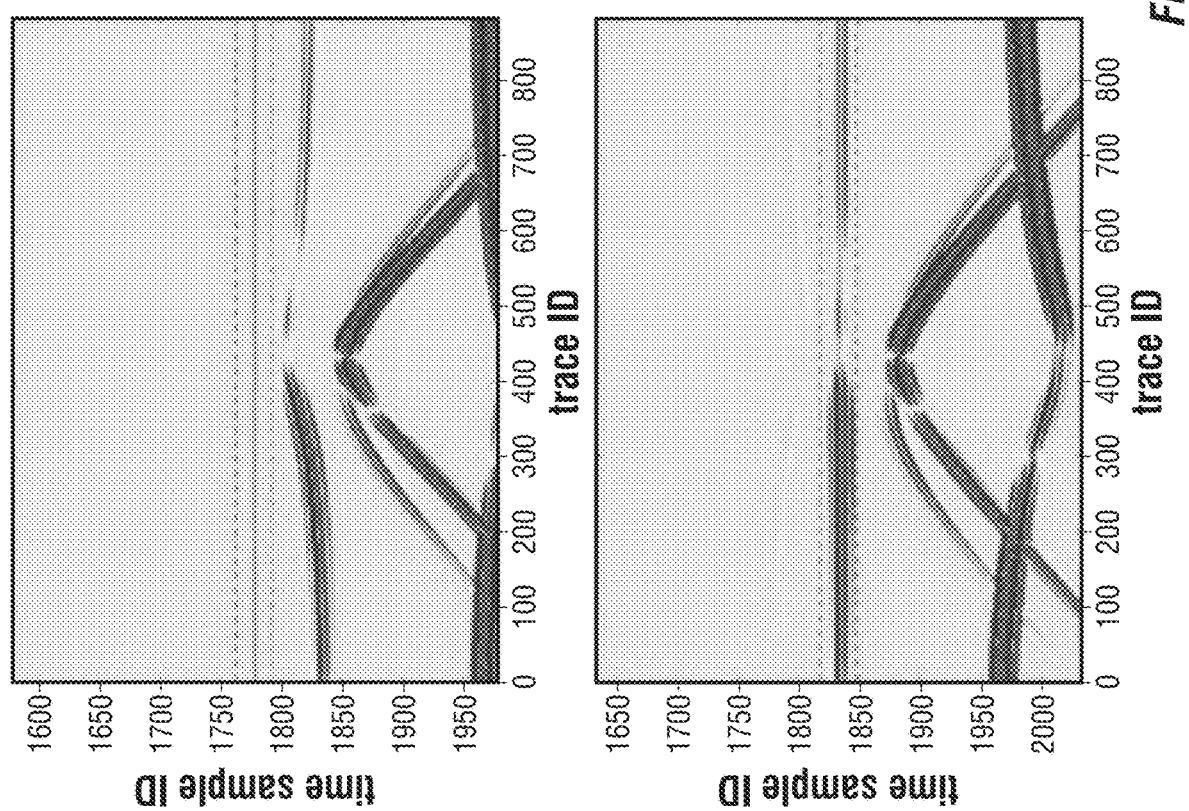
FIG. 12

SYSTEMS AND METHODS FOR DETECTING A SUBSURFACE EVENT

CROSS-REFERENCE TO RELATED APPLICATIONS

This application claims the benefit of U.S. Patent Application No. 62/698,685 filed on Jul. 16, 2018, the contents of which is hereby incorporated herein by reference in its entirety.

FIELD OF THE DISCLOSURE

The present disclosure relates to systems and methods for detecting a given subsurface event in a subsurface volume of interest.

SUMMARY

One aspect of the present disclosure relates to a method for detecting a given subsurface event in a subsurface volume of interest. The method may include receiving a subsurface fiber optic data set of the given subsurface event. The subsurface fiber optic data set includes responses detected by a fiber optic apparatus. A given subsurface fiber optic data specifies parameter values of parameters as a function of position in the subsurface volume of interest. The method may include constraining the subsurface fiber optic data set based on a given parameter value of a given parameter within a certain range to generate a constrained subsurface fiber optic data set. The method may include using sets of models to refine the constrained subsurface fiber optic data set to generate a refined subsurface fiber optic data set. The method may include estimating an event location of the given subsurface event based on the refined subsurface fiber optic data set. The method may include estimating an origin time based on the event location.

In implementations, the method may further include receiving a sensor data set of the given subsurface event. The sensor data set may include responses detected by a sensor. A given sensor data specifies parameter values of parameters as a function of position within the subsurface volume of interest. The method may further include refining the event location of the subsurface event using the sensor data set.

In implementations, refining the event location of the subsurface event using the sensor data set may include identifying a set of potential locations based on the refined subsurface fiber optic data set. Refining the event location of the subsurface event using the sensor data set may also include deriving directionality from sensor data set based on polarization analysis. The sensor data set includes responses detected by a subsurface geophone. Refining the event location of the subsurface event using the sensor data set may further include selecting the correct location among the potential locations using the refined subsurface fiber optic data set and the sensor data set.

In implementations, refining the event location of the subsurface event using the sensor data set may include identifying a set of potential locations based on the refined subsurface fiber optic data set. Refining the event location of the subsurface event using the sensor data set may also include deriving multiple location semblance values based on traveltimes to one or more sensors corresponding to the sensor data set. The sensor data set includes responses detected by a surface geophone. Refining the event location of the subsurface event using the sensor data set may include refining the event location from the set of potential locations based on one of the multiple location semblance values.

In implementations, the method may further include generating a digital seismic image that represents the refined subsurface fiber optic data set using visual effects to depict at least a portion of the parameter values in the refined subsurface fiber optic data set and at least a portion of the parameter values in the sensor data set as a function of position within the subsurface volume of interest; and displaying the digital seismic image on a graphical user interface.

In implementations, the fiber optic apparatus forms a distributed acoustic sensing cable.

In implementations, the sensor includes one or more of a fiber optic apparatus or a geophone.

In implementations, a first set of models may include a multiple signal classification model, and a semblance-based model.

In implementations, the method may further include generating sets of probability maps of a given subsurface event by applying the first set of models to the constrained subsurface fiber optic data sets. A given set of probability maps includes a first probability map based on applying the multiple signal classification model and a second probability map based on applying the semblance-based model. The method may further include limiting the constrained subsurface fiber optic data set based on whether a semblance value of the given set of probability maps surpasses a threshold semblance value to generate a limited subsurface fiber optic data set.

In implementations, a second set of models may include an interferometry model; and a time reversal model.

In implementations, the method may further include applying the interferometry model to the limited subsurface fiber optic data set. Applying the interferometry model to the limited subsurface fiber optic data set may include binning the limited subsurface fiber optic data set. Applying the interferometry model to the limited subsurface fiber optic data set may also include calculating cross-correlations between a reference subsurface fiber optic data and other subsurface fiber optic data set from the limited subsurface fiber optic data set. Applying the interferometry model to the limited subsurface fiber optic data set may further include migrating traces to the given subsurface volume of interest based on a shift between the reference trace and the traces from the limited subsurface fiber optic data set to generate partial digital seismic images. Applying the interferometry model to the limited subsurface fiber optic data set may include combining the partial digital seismic images to generate an updated location. The method may further include applying the time reversal model to the limited subsurface fiber optic data set to estimate the event location. The method may include refining the limited subsurface fiber optic data set based on whether the event location using the interferometry model and the event location using the time reversal model are within a threshold spatial value to generate a refined subsurface fiber optic data set.

In implementations, the method may further include determining whether semblance values of the refined subsurface fiber optic data set surpasses a refined threshold value.

In implementations, the sensor data set is used to derive a wavespeed structure.

In implementations, an origin time may be updated by applying one or more of the subsurface fiber optic data set, the constrained subsurface fiber optic data set, and the refined subsurface fiber optic data set.

In implementations, estimating an origin time based on the event location may include obtaining a velocity model; and estimating an origin time based on arrival times corresponding to the refined subsurface fiber optic data set and propagation times based on the velocity model and the event location.

In implementations, the velocity model is based on well data.

In implementations, the origin time is a given arrival time minus a corresponding propagation time.

One aspect of the present disclosure relates to a system for detecting a given subsurface event in a subsurface volume of interest. The system may include electronic storage and one or more physical computer processors configured by machine readable instructions. The one or more physical computer processors may be configured to receive a subsurface fiber optic data set of the given subsurface event. The subsurface fiber optic data set includes responses detected by a fiber optic apparatus. A given subsurface fiber optic data specifies parameter values of parameters as a function of position in the subsurface volume of interest. The one or more physical computer processors may be configured to constrain the subsurface fiber optic data set based on a given parameter value of a given parameter within a certain range to generate a constrained subsurface fiber optic data set. The one or more physical computer processors may be configured to use sets of models to refine the constrained subsurface fiber optic data set to generate a refined subsurface fiber optic data set. The one or more physical computer processors may be configured to estimate an event location of the given subsurface event based on the refined subsurface fiber optic data set. The one or more physical computer processors may be configured to estimate an origin time based on the event location.

The one or more physical computer processors may be further configured to receive a sensor data set of the given subsurface event. The sensor data set includes responses detected by a sensor. A given sensor data specifies parameter values of parameters as a function of position within the subsurface volume of interest. The one or more physical computer processors may be configured to refine the event location of the subsurface event using the sensor data set.

In implementations, refining the event location of the subsurface event using the sensor data set may include identifying a set of potential locations based on the refined subsurface fiber optic data set. Refining the event location of the subsurface event using the sensor data set may further include deriving directionality from sensor data set based on polarization analysis. The sensor data set includes responses detected by a subsurface geophone. Refining the event location of the subsurface event using the sensor data set may further include selecting the correct location among the potential locations using the refined subsurface fiber optic data set and the sensor data set.

One aspect of the present disclosure relates to a non-transitory computer readable medium including instructions that, when executed by one or more physical computer processors, cause the one or more physical computer processors to refine estimated effects of parameters on amplitudes by performing one or more steps. One step may include receiving a subsurface fiber optic data set of the given subsurface event. The subsurface fiber optic data set includes responses detected by a fiber optic apparatus. A given subsurface fiber optic data specifies parameter values of parameters as a function of position in the subsurface volume of interest. One step may include constraining the subsurface fiber optic data set based on a given parameter value of a given parameter within a certain range to generate a constrained subsurface fiber optic data set. One step may include using sets of models to refine the constrained subsurface fiber optic data set to generate a refined subsurface fiber optic data set. One step may include estimating an event location of the given subsurface event based on the refined subsurface fiber optic data set. One step may include estimating an origin time based on the event location.

One aspect of the present disclosure relates to a system configured for detecting a given subsurface event in a subsurface volume of interest. The system may include one or more physical computer processors configured by machine-readable instructions. The processor(s) may be configured to receive a subsurface fiber optic data set of the given subsurface event. The subsurface fiber optic data set includes responses detected by a fiber optic apparatus. A given subsurface fiber optic data may specify parameter values of parameters as a function of position in the subsurface volume of interest. The processor(s) may be configured to receive a sensor data set of the given subsurface event. The sensor data set includes responses detected by one or more sensors. A given sensor data may specify parameter values of parameters as a function of position within the subsurface volume of interest. The processor(s) may be configured to constrain the subsurface fiber optic data set based on a given parameter value of a given parameter within a certain range to generate a constrained subsurface fiber optic data set. The processor(s) may be configured to use sets of models to refine the constrained subsurface fiber optic data set to generate a refined subsurface fiber optic data set. The processor(s) may be configured to generate a moment tensor corresponding to the given subsurface event using the refined subsurface fiber optic data set and the sensor data set. The processor(s) may be configured to generate a digital seismic image that represents the moment tensor and the refined subsurface fiber optic data set using visual effects to depict at least a portion of the moment tensor and at least a portion of the parameter values in the refined subsurface fiber optic data set, such as event origin time and location within the subsurface volume of interest. The processor(s) may be configured to display the digital seismic image on a graphical user interface.

One aspect of the present disclosure relates to a method for detecting a given subsurface event in a subsurface volume of interest. The method may include receiving a subsurface fiber optic data set of the given subsurface event. The subsurface fiber optic data set includes responses detected by a fiber optic apparatus. A given subsurface fiber optic data may specify parameter values of parameters as a function of position of the fiber optic apparatus located in the subsurface volume of interest. The method may include receiving a sensor data set of the given subsurface event using one or more sensors. The sensor data set includes responses detected by one or more sensors. A given sensor data may specify parameter values of parameters as a function of position within the subsurface volume of interest. The method may include constraining the subsurface fiber optic data set based on a given parameter value of a given parameter within a certain range to generate a constrained subsurface fiber optic data set. The method may include using sets of models to refine the constrained subsurface fiber optic data set to generate a refined subsurface fiber optic data set. The method may include generating a moment tensor corresponding to the given subsurface event using the refined subsurface fiber optic data set and the sensor data set. The method may include generating a digital seismic image that represents the moment tensor and the refined subsurface fiber optic data set using visual effects to depict at least a portion of the moment tensor and at least a portion of the parameter values in the refined subsurface fiber optic data set, such as event origin time and location within the subsurface volume of interest. The method may include displaying the digital seismic image on a graphical user interface.

One aspect of the present disclosure relates to a method for detecting a given subsurface event in a subsurface volume of interest. The method may include using a fiber optic sensing apparatus configured for distributed acoustic sensing detect responses in the subsurface volume of interest. The method may include receiving a subsurface fiber optic data set of the given subsurface event. The subsurface fiber optic data set includes responses detected by a fiber optic apparatus. A given subsurface fiber optic data may specify parameter values of parameters as a function of position of the fiber optic apparatus located in the subsurface volume of interest. The method may include using one or more sensors to detect responses in the subsurface volume of interest. The method may include receiving a sensor data set of the given subsurface event using one or more sensors. The sensor data set includes responses detected by one or more sensors. A given sensor data may specify parameter values of parameters as a function of position within the subsurface volume of interest. The method may include constraining the subsurface fiber optic data set based on a given parameter value of a given parameter within a certain range to generate a constrained subsurface fiber optic data set. The method may include using sets of models to refine the constrained subsurface fiber optic data set to generate a refined subsurface fiber optic data set. The method may include generating a moment tensor corresponding to the given subsurface event using the refined subsurface fiber optic data set and the sensor data set. The method may include generating a digital seismic image that represents the moment tensor and the refined subsurface fiber optic data set using visual effects to depict at least a portion of the moment tensor and at least a portion of the parameter values in the refined subsurface fiber optic data set, such as event origin time and location within the subsurface volume of interest. The method may include displaying the digital seismic image on a graphical user interface.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the presently disclosed technology. As used in the specification and in the claims, the singular form of "a", "an", and "the" include plural referents unless the context clearly dictates otherwise.

BRIEF DESCRIPTION OF THE DRAWINGS

FIG. 2A-2 illustrates a cross-sectional view of a hydraulic wet connect at liner top with capillary tubing being clamped to tubing above the liner top, in accordance with one or more implementations.

FIG. 2B-1 illustrates capillary tubing clamped to a production casing, in accordance with one or more implementations.

FIG. 2B-2 illustrates a cross-sectional view of capillary tubing clamped to a production casing, in accordance with one or more implementations.

FIG. 2C-1 illustrates capillary tubing clamped to tubing, in accordance with one or more implementations.

FIGS. 2C-2 illustrates a cross-sectional view of capillary tubing clamped to tubing, in accordance with one or more implementations.

FIG. 2D-1 illustrates capillary tubing positioned within an instrument coiled tubing, in accordance with one or more implementations.

FIG. 2D-2 illustrates a cross-sectional view of capillary tubing positioned within an instrument coiled tubing, in accordance with one or more implementations.

FIG. 12 illustrates a false-positive event candidate that may be caused by crosstalk between two true events close to each other, which can be removed based on a marching-pursue approach.

DETAILED DESCRIPTION

Figure 1A:
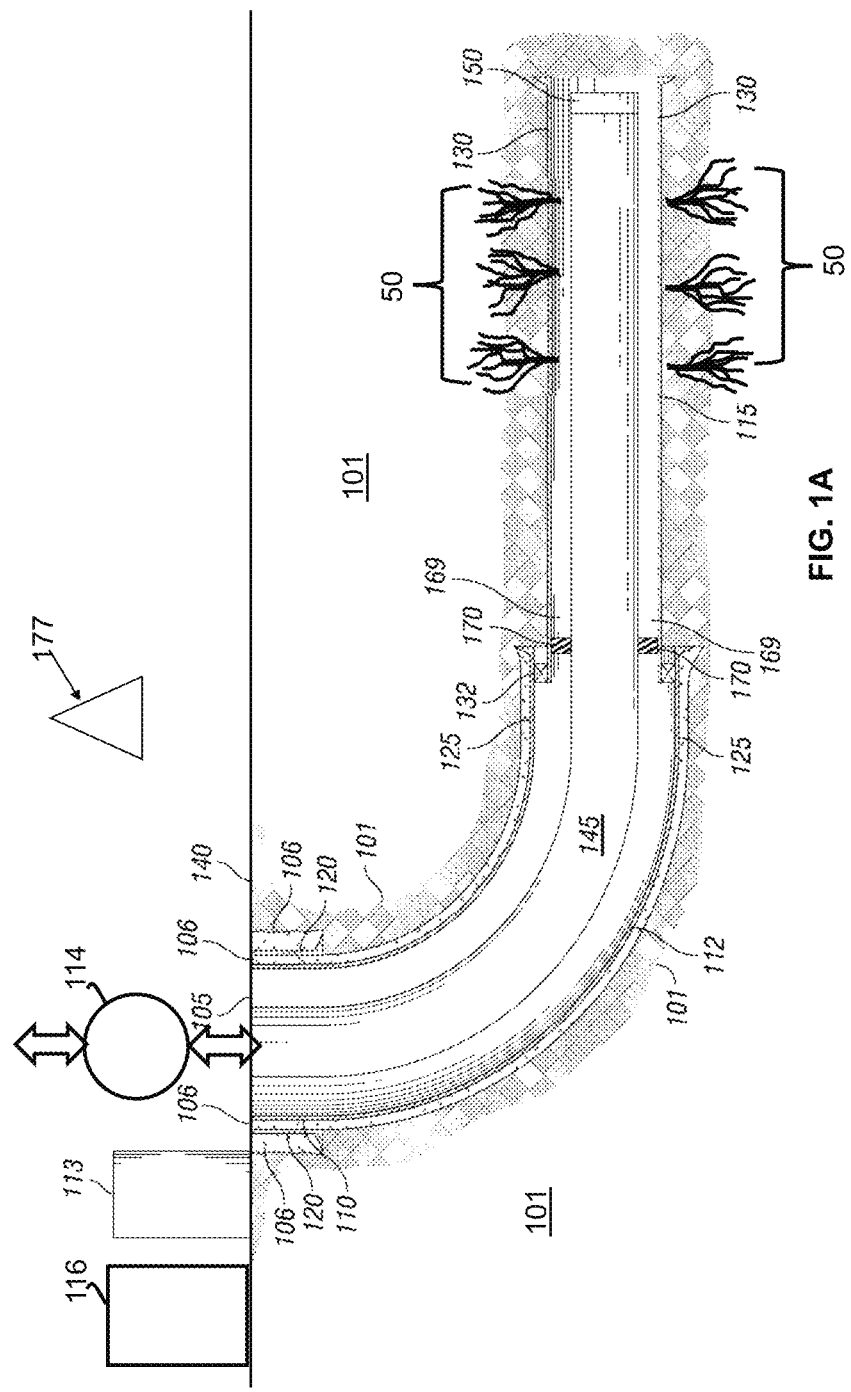
FIG. 1A illustrates a schematic sectional view of a subsurface volume of interest in fluidic communication with a wellbore during a fracturing process in accordance with one or more implementations.

Terminology:

The following terms will be used throughout the specification and will have the following meanings unless otherwise indicated.

Hydrocarbon exploration processes, hydrocarbon recovery processes, or any combination thereof may be performed on a "subsurface volume of interest". The "subsurface volume of interest" refers to practically anything under a surface. For example, the subsurface volume of interest may be practically anything under a terrestrial surface (e.g., practically anything under a land surface), practically anything under a seafloor, etc. A water column may be above the subsurface volume of interest, for example, in marine hydrocarbon exploration, in marine hydrocarbon recovery, etc. The subsurface volume of interest may be onshore in some implementations. Alternatively, the subsurface volume of interest may be offshore, with shallow water or deep water above the subsurface volume of interest, in some implementations. The subsurface volume of interest may include faults, fractures, overburdens, underburdens, salts, salt welds, rocks, sands, sediments, pore space, etc. The subsurface volume of interest may include practically any geologic point(s) or volume(s) of interest (such as a survey area).

The subsurface volume of interest may also include hydrocarbons, such as liquid hydrocarbons (also known as oil or petroleum), gas hydrocarbons (e.g., natural gas), solid hydrocarbons (e.g., asphaltenes or waxes), a combination of liquid hydrocarbons, gas hydrocarbons, and solid hydrocarbons, etc. Light crude oil, medium oil, heavy crude oil, and extra heavy oil, as defined by the American Petroleum Institute (API) gravity, are examples of hydrocarbons. Indeed, examples of hydrocarbons are many, and may include, oil, natural gas, kerogen, bitumen, clathrates (also referred to as hydrates), etc. The subsurface volume of interest may be known to include hydrocarbons in some implementations. However, the subsurface volume of interest may not be known to include hydrocarbons, such as during hydrocarbon exploration, in other implementations.

The subsurface volume of interest may also include at least one wellbore. For example, at least one wellbore may be drilled into the subsurface volume of interest in order to confirm the presence of hydrocarbons. As another example, at least one preexisting wellbore into the subsurface volume of interest or at least one new wellbore drilled into the subsurface may be used to recover the hydrocarbons. The hydrocarbons may be recovered from the entire subsurface or from a portion of the subsurface. For example, the subsurface may be divided up into one or more hydrocarbon zones, and hydrocarbons may be recovered from each desired hydrocarbon zone. In some implementations, one or more of hydrocarbon zones may even be shut in to increase hydrocarbon recovery from a hydrocarbon zone that is not shut in.

The hydrocarbons may be recovered (sometimes referred to as produced) from the subsurface volume of interest using primary recovery (e.g., by relying on pressure to recover the hydrocarbons), secondary recovery (e.g., by using water injection (also referred to as waterflooding) or gas injection to recover hydrocarbons), enhanced oil recovery (EOR), or any combination thereof. The term "enhanced oil recovery" refers to techniques for increasing the amount of hydrocarbons that may be extracted from the volume of interest. Enhanced oil recovery may also be referred to as improved oil recovery or tertiary oil recovery. Secondary recovery may also just be referred to as enhanced oil recovery.

The hydrocarbons may also be recovered from the subsurface volume of interest using fracturing. For example, fracturing may include fracturing using electrodes, fracturing using fluid (oftentimes referred to as hydraulic fracturing), etc. For example, hydraulic fracturing may entail preparing an injection fluid (oftentimes referred to a fracturing fluid) and injecting that fracturing fluid into the wellbore at a sufficient rate and pressure to open existing fractures and/or create fractures in the subsurface volume of interest. The fractures permit hydrocarbons to flow more freely into the wellbore. Fracturing may be performed onshore, offshore, or any combination thereof.

In the hydraulic fracturing process, the fracturing fluid may be prepared on-site to include at least proppants. The proppants, such as sand or other particles, are meant to hold the fractures open so that hydrocarbons can more easily flow to the wellbore. The fracturing fluid and the proppants may be blended together using at least one blender. The fracturing fluid may also include other components in addition to the proppants. The wellbore and the subsurface volume of interest proximate to the wellbore are in fluid communication (e.g., via perforations), and the fracturing fluid with the proppants is injected into the wellbore through a wellhead of the wellbore using at least one pump (oftentimes called a fracturing pump). The fracturing fluid with the proppants is injected at a sufficient rate and pressure to open existing fractures and/or create fractures in the subsurface volume of interest. As fractures become sufficiently wide to allow proppants to flow into those fractures, proppants in the fracturing fluid are deposited in those fractures during injection of the fracturing fluid. The fracturing fluid is removed by flowing or pumping it back out of the wellbore so that the fracturing fluid does not block the flow of hydrocarbons to the wellbore. The hydrocarbons will typically enter the same wellbore from the subsurface volume of interest and go up to the surface for further processing. The fracturing may be performed in stages in some implementations.

The equipment to be used in preparing and injecting the fracturing fluid may be dependent on the components of the fracturing fluid, the proppants, the wellbore, the subsurface volume of interest, etc. However, for simplicity, the term "fracturing apparatus" is meant to represent any tank(s), mixer(s), blender(s), pump(s), manifold(s), line(s), valve(s), fluid(s), fracturing fluid component(s), proppants, and other equipment and techniques related to preparing the fracturing fluid, injecting the fracturing fluid, and fracturing.

The hydrocarbons may also be recovered from the subsurface volume of interest using radio frequency (RF) heating. For example, at least one radio frequency antenna may be utilized to increase the temperature of hydrocarbons, such as heavy oil, to reduce viscosity. The hydrocarbons with lower viscosity may then be produced from the subsurface volume of interest with an improved flow rate.

The physical equipment to be used in radio frequency heating is dependent on the wellbore, the subsurface volume of interest, etc. However, for simplicity, the term "radio frequency heating apparatus" is meant to represent any antenna(s), fluid(s), and other equipment and techniques related to radio frequency heating.

Other hydrocarbon recovery processes may also be utilized to recover the hydrocarbons. Furthermore, those of ordinary skill in the art will appreciate that one hydrocarbon recovery process may also be used in combination with at least one other recovery process or subsequent to at least one other recovery process. Moreover, hydrocarbon recovery processes may also include stimulation or other treatment. For example, radio frequency heating may be used in combination with at least one other recovery process, such as, but not limited to, steam flooding.

The subsurface volume of interest, the hydrocarbons, or any combination thereof may also include non-hydrocarbon items. For example, non-hydrocarbon items may include connate water, brine, tracers, items used in enhanced oil recovery or other hydrocarbon recovery processes, items from other types of treatments (e.g., gels used in conformance control), etc.

In short, each subsurface volume of interest may have a variety of characteristics, such as petrophysical rock properties, reservoir fluid properties, reservoir conditions, or any combination thereof. For example, each subsurface volume of interest may be associated with one or more of: temperature, porosity, permeability, water composition, mineralogy, hydrocarbon type, hydrocarbon quantity, reservoir location, pressure, etc. Indeed, those of ordinary skill in the art will appreciate that the characteristics are many, including, but not limited to: shale gas, shale oil, tight gas, tight oil, tight carbonate, carbonate, vuggy carbonate, unconventional (e.g., a rock matrix with an average pore size less than 1 micrometer), diatomite, geothermal, coalbed methane, a methane hydrate containing subsurface volume of interest, a mineral containing subsurface volume of interest, a metal containing subsurface volume of interest, a subsurface volume of interest having a permeability in the range of 0.01 microdarcy to 10 millidarcy, a subsurface volume of interest having a permeability in the range of 10 millidarcy to 40,000 millidarcy, etc.

The term "subsurface volume of interest" may be used synonymously with the term "reservoir" or "subsurface reservoir" or "subsurface region of interest" or "formation" or "subsurface formation." The subsurface volume of interest may also include a reservoir, a formation, or any combination thereof. Thus, the terms "subsurface volume of interest," "hydrocarbons," and the like are not limited to any description or configuration described herein.

"Wellbore" refers to a single hole, usually cylindrical, that is drilled into the subsurface volume of interest for hydrocarbon exploration, hydrocarbon recovery, or any combination thereof. The wellbore is surrounded by the subsurface volume of interest and the wellbore may be in fluidic communication with the subsurface volume of interest (e.g., via perforations). The wellbore may also be in fluidic communication with the surface, such as a surface facility that may include oil/gas/water separators, gas compressors, storage tanks, pumps, gauges, pipelines, etc.

The wellbore may be used for injection in some implementations. The wellbore may be used for production in some implementations. The wellbore may be used for fracturing in some implementations. The wellbore may be used for a single function, such as only injection, in some implementations. The wellbore may be used for a plurality of functions, such as both injection and production in some implementations. The use of the wellbore may also be changed, for example, a particular wellbore may be turned into an injection wellbore after a different previous use. The wellbore may be drilled amongst existing wellbores as an infill wellbore. A plurality of wellbores (e.g., tens to hundreds of wellbores) are often used in a field to recover hydrocarbons. As an example, the hydrocarbons may be swept from a single injection wellbore towards at least one production wellbore and then up towards the surface for further processing.

The wellbore may have vertical, horizontal, or combination trajectories. For example, the wellbore may be a vertical wellbore, a horizontal wellbore, a multilateral wellbore, an inclined wellbore, a slanted wellbore, etc. The wellbore may include a "build section." "Build section" refers to practically any section of a wellbore where the deviation is changing. As an example, the deviation is changing when the wellbore is curving. In a horizontal wellbore, the build section is the curved section between the vertical section of the horizontal wellbore and the horizontal section of the horizontal wellbore. Wellbores that are not horizontal wellbores may also include build sections. For example, inclined or slanted wellbores may each include a build section.

The wellbore may include a plurality of components, such as, but not limited to, a casing, a liner, a tubing string, a heating element, a sensor, a packer, a screen, a gravel pack, etc. The "casing" refers to a steel pipe cemented in place during the wellbore construction process to stabilize the wellbore. The "liner" refers to any string of casing in which the top does not extend to the surface but instead is suspended from inside the previous casing. The "tubing string" or simply "tubing" is made up of a plurality of tubulars (e.g., tubing, tubing joints, pup joints, etc.) connected together. The tubing string is lowered into the casing or the liner for injecting a fluid into the subsurface volume of interest, producing a fluid from the subsurface volume of interest, or any combination thereof. The casing may be cemented in place, with the cement positioned in the annulus between the subsurface volume of interest and the outside of the casing. The wellbore may also include any completion hardware that is not discussed separately. If the wellbore is drilled offshore, for example, the wellbore may include some of the previous components plus other components such as a riser and others.

The wellbore may also include equipment to control fluid flow into the wellbore, control fluid flow out of the wellbore, or any combination thereof. For example, each wellbore may include a wellhead, a BOP, chokes, valves, or other control devices. These control devices may be located on the surface, under the surface (e.g., downhole in the wellbore), or any combination thereof. In some implementations, the same control devices may be used to control fluid flow into and out of the wellbore, but different control devices may even be used. In some implementations, the rate of flow of fluids through the wellbore may depend on the fluid handling capacities of the surface facility that is in fluidic communication with the wellbore. The control devices may also be utilized to control the pressure profile of the wellbore.

The equipment to be used in controlling fluid flow into and out of the wellbore may be dependent on the wellbore, the subsurface volume of interest, the surface facility, etc. However, for simplicity, the term "control apparatus" is meant to represent any wellhead(s), BOP(s), choke(s), valve(s), fluid(s), and other equipment and techniques related to controlling fluid flow into and out of the wellbore.

The wellbore may be drilled into the subsurface volume of interest using practically any drilling technique and equipment known in the art, such as geosteering, directional drilling, etc. For example, drilling the wellbore may include using a tool such as a drilling tool. The drilling tool may include a drill bit and a drill string. Drilling fluid, such as drilling mud, may be used while drilling in order to cool the drill tool and remove cuttings. Other tools may also be used while drilling or after drilling, such as measurement-while-drilling (MWD) tools, seismic-while-drilling (SWD) tools, wireline tools, logging-while-drilling (LWD) tools, other downhole tools, etc. After drilling to a predetermined depth, the drill string and the drill bit are removed, and then the casing, the tubing, etc. may be installed according to the design of the wellbore.

The equipment to be used in drilling the wellbore may be dependent on the design of the wellbore, the subsurface volume of interest, the hydrocarbons, etc. However, for simplicity, the term "drilling apparatus" is meant to represent any drill bit(s), drill string(s), drilling fluid(s), and other equipment and techniques related to drilling the wellbore.

Some non-limiting examples of wellbores may be found in U.S. Patent Application Publication No. 2014/0288909 (Attorney Dkt. No. T-9407) and U.S. Patent Application Publication No. 2017/0058186 (Attorney Dkt. No. T-10197), each of which is incorporated by reference in its entirety. The term "wellbore" may be used synonymously with the terms "borehole," "well," or "well bore." The term "wellbore" is not limited to any description or configuration described herein.

The term "proximate" is defined as "near". If item A is proximate to item B, then item A is near item B. For example, in some implementations, item A may be in contact with item B. For example, in some implementations, there may be at least one barrier between item A and item B such that item A and item B are near each other, but not in contact with each other. The barrier may be a fluid barrier, a non-fluid barrier (e.g., a structural barrier), or any combination thereof. Both scenarios are contemplated within the meaning of the term "proximate."

The terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. For example, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%. Furthermore, a range may be construed to include the start and the end of the range. For example, a range of 10% to 20% (i.e., range of 10%-20%) includes 10% and also includes 20%, and includes percentages in between 10% and 20%, unless explicitly stated otherwise herein.

The term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if an item is described herein as including a component of type A, a component of type B, a component of type C, or any combination thereof, it is understood that this phrase describes all of the various individual and collective combinations and permutations of these components. For example, in some implementations, the item described by this phrase could include only a component of type A. In some implementations, the item described by this phrase could include only a component of type B. In some implementations, the item described by this phrase could include only a component of type C. In some implementations, the item described by this phrase could include a component of type A and a component of type B. In some implementations, the item described by this phrase could include a component of type A and a component of type C. In some implementations, the item described by this phrase could include a component of type B and a component of type C. In some implementations, the item described by this phrase could include a component of type A, a component of type B, and a component of type C. In some implementations, the item described by this phrase could include two or more components of type A (e.g., A1 and A2). In some implementations, the item described by this phrase could include two or more components of type B (e.g., B1 and B2). In some implementations, the item described by this phrase could include two or more components of type C (e.g., C1 and C2). In some implementations, the item described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some implementations, the item described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some implementations, the item described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software, or any combination thereof.

Unless defined otherwise, all technical and scientific terms used herein have the same meanings as commonly understood by one of skill in the art to which the disclosed invention belongs. All citations referred herein are expressly incorporated by reference.

Overview

Fiber optics is a growing field for subsurface exploration. While fiber optic apparatuses may provide dense sampling rates of subsurface data for subsurface events, multiple challenges are presented. Fiber optic apparatuses, for example fiber optic distribution acoustic sensing (DAS) systems, may measure one component of the strain or strain rate, losing other relevant information. Amplitude variation, phase rotation, and polarity flip may also be more common due to the behavior of strain and strain rate, for example. In addition, signal to noise ratios of fiber optic data may require extensive preprocessing.

Systems and methods disclosed herein may configured to detect subsurface events using fiber optic apparatuses. The raw data from a fiber optic apparatus may be preprocessed to improve signal to noise ratio and remove other artifacts to generate a subsurface fiber optic data set. Sensor data, including, for example, other fiber optic data from a different source, data from 3C geophones, and/or data from subsurface and/or surface geophones, may also be received. The subsurface fiber optic data set may be constrained based on a given parameter value within a certain range to generate a constrained subsurface fiber optic data set. Sets of models may be used to refine the constrained subsurface fiber optic data set to generate a refined subsurface fiber optic data set. The refined subsurface fiber optic data set may be validated and, in some implementations, steps may be repeated to improve the location and origin times. Using the refined subsurface fiber optic data set and the sensor data set a moment tensor may be generated corresponding to the subsurface event. A digital seismic image may be generated of the moment tensor. The digital seismic image may be displayed in a graphical user interface.

Advantageously, those of ordinary skill in the art will appreciate, for example, that the implementations provided herein may be utilized to generate a digital seismic image. The digital seismic image may improve hydrocarbon exploration and improve hydrocarbon production. The digital seismic image may provide details of the subsurface that were illustrated poorly or not at all in traditional seismic images. Moreover, the digital seismic image may better delineate where different features begin, end, or any combination thereof. As one example, the digital seismic image may illustrate faults more accurately.

Those of ordinary skill in the art will appreciate, for example, that the digital seismic image may be utilized in hydrocarbon exploration and hydrocarbon production for decision making and control. For example, the digital seismic image may be utilized to steer a tool (e.g., drilling tool) to drill a wellbore. Continuing with the clathrate deposit example, a drilling tool may be steered to drill one or more wellbores to produce the clathrate deposit or steered to avoid the clathrate deposit depending on the desired outcome. Steering the tool may include drilling around or avoiding certain subsurface features (e.g., faults, salt diapirs, shale diapirs, shale ridges, pockmarks, buried channels, gas chimneys, shallow gas pockets, and slumps), drilling through certain subsurface features (e.g., clathrate deposit), or any combination thereof depending on the desired outcome.

Those of ordinary skill in the art will appreciate, for example, that the digital seismic image may be utilized to select completions, components, fluids, etc. for a wellbore. Some recovery techniques and devices, amongst many options, are provided in the following: U.S. Pat. Nos. 9,777,563, 7,812,203, U.S. Patent App. Pub. No. 2008/0102000, U.S. Pat. Nos. 7,964,150, 8,201,626, and 7,537,058, all of which are incorporated by reference in their entireties.

In short, those of ordinary skill in the art will appreciate that there are many decisions (e.g., in the context of (a) steering decisions; (b) landing decisions, (c) completion decisions, (d) engineering control systems and reservoir monitoring in the following but not limited to: Tow Streamer, Ocean Bottom Sensor, VSP, DASVSP, and imaging with both primaries and free surface multiple, etc.) to make in the hydrocarbon industry and making proper decisions based on digital seismic images should improve the likelihood of safe and reliable operations. For simplicity, the many possibilities, including wellbore location, component selection for the wellbore, recovery technique selection, controlling flow of fluid, etc., may be collectively referred to as managing a subsurface reservoir.

Subsurface Event Detection System Overview:

Seismic Source:

A "seismic source" (or simply "source") refers to practically anything that generates seismic excitations. The seismic excitations may be seismic waves, such as sound waves. The seismic excitations may sometimes be referred to as subsurface events. A seismic source may be active or passive. An active seismic source is activated to send at least one seismic wave. For example, the active seismic source may be an air gun, a water gun, a vibrator, a marine vibrator, etc. A passive seismic source passively sends at least one seismic wave. For example, the passive seismic source may be an ocean wave, a passing ship, a storm, an interfering seismic survey, environmental energy, etc. Furthermore, the seismic source may be practically any seismic source that is compatible with a fiber optic apparatus (discussed further hereinbelow). In some implementations, a plurality of seismic sources generate seismic excitations. The plurality of seismic sources may be of the same type, or alternatively, the plurality of seismic sources may be a combination of different types.

Depending on the implementation, one or more seismic sources may be in the subsurface volume of interest (e.g., downhole in a wellbore drilled into the subsurface volume of interest), one or more seismic sources may be outside of the subsurface volume of interest (e.g., on a terrestrial surface using a vibroseis truck or on an aquatic surface deployed on or pulled by a sea surface vessel), or any combination thereof. The sea surface vessel may be a ship, a platform, a FPSO (Floating, Production, Storage, and Offloading vessel), Automated Surface Vehicle (AS), etc. The equipment to be used in installing a seismic source (e.g., such as installing an active seismic source) may be dependent on the type of the seismic source, location where the seismic source is to be installed, whether the installation is temporary or more permanent, etc. However, for simplicity, the term "seismic source installation apparatus" is meant to represent any truck(s), towline(s), sea surface vessel(s), float(s), and other equipment and techniques related to installing a seismic source. Regardless of the location of the seismic sources, the seismic excitations in the subsurface volume of interest, outside of the subsurface volume of interest, or any combination thereof may be used in some implementations.

Furthermore, hydrocarbon recovery processes, such as, but not limited to, a fracturing process may generate seismic excitations. As discussed hereinabove, a fracturing apparatus may be utilized to open existing fractures and/or create fractures in the subsurface volume of interest. Opening the existing fractures and/or creating the fractures may cause seismic excitations in the subsurface volume of interest.

Seismic Sensor:

A "seismic sensor" (or simply "sensor") refers to practically anything that detects responses associated with seismic excitations. One implementation of a seismic sensor is a geophone, such as a one component (1C) or a three component (3C) geophone. One implementation of a seismic sensor is an accelerometer. One implementation of a seismic sensor is a hydrophone. One implementation of the seismic sensor is a fiber optic (FO) apparatus. The FO apparatus, for example, may be configured to perform at least distributed acoustic sensing (DAS). In some implementations, the FO apparatus may be configured to perform distributed pressure sensing (DPS), distributed temperature sensing (DTS), or any combination thereof in addition to DAS. In some implementations, a plurality of seismic sensors may detect responses associated with seismic excitations. The plurality of seismic sensors may be of the same type, or alternatively, the plurality of seismic sensors may be a combination of different types. For example, in one implementation, at least two FO apparatuses, with each configured to perform at least DAS, may utilized. Alternatively, at least one FO apparatus configured to perform at least DAS and at least one other seismic sensor (e.g., a hydrophone, a geophone, etc.) may be utilized. In implementations, the at least one seismic sensor may be co-located with the at least one FO apparatus, may be in a wellbore, and/or may be otherwise located in the subsurface volume of interest. The at least one seismic sensor may be located based on finite difference modeling, an analytical Green Tensor, moment tensor information, subsurface fiber optic data set, and/or other information. An acquisition design may be generated to determine the appropriate acquisition geometry for the at least one seismic sensor. The acquisition design may simulate responses from each component of the moment tensor for any acquisition geometry. Based on this information, a linear inverse equation may be derived and a corresponding Hessian matrix including eigenvalues and a condition number indicates how well the inverse problem is constrained or how suitable a given acquisition geometry is for inverting the moment tensor. By comparing eigenvalues and/or condition numbers of different Hessian matrix from different acquisition geometries, acquisition geometries can be selected to apply in a given subsurface volume of interest.

Furthermore, it is contemplated a single entity may perform an embodiment consistent with this disclosure. It is also contemplated that a plurality of entities may perform an embodiment consistent with the disclosure. For example, it is contemplated that a particular entity may install a fiber optic apparatus and one or more sensors, process data from the fiber optic apparatus and the one or more sensors, and detect subsurface events with the data. For example, it is also contemplated that a particular entity receives data (raw and/or processed) from the fiber optic apparatus and the one or more sensors, and one or more other entities installs the fiber optic apparatus and the one or more sensors, as well as processes the data from the fiber optic apparatus and the one or more sensors.

Depending on the implementation, one or more seismic sensors may be in the subsurface volume of interest (e.g., downhole in a wellbore drilled into the subsurface volume of interest, trench or dug hole in the subsurface volume of interest), one or more seismic sensors may be outside of the subsurface volume of interest (e.g., in a trench or dug hole outside of the subsurface volume of interest), or any combination thereof. The equipment to be used in installing a seismic sensor may be dependent on the type of the seismic sensor, location where the seismic sensor is to be installed, whether the installation is temporary or more permanent, etc. However, for simplicity, the term "seismic sensor installation apparatus" is meant to represent any clamp(s), strap(s), reel(s), and other equipment and techniques related to installing a seismic sensor. Regardless of the location of the seismic sensors, responses associated with seismic excitations in the subsurface volume of interest may be detected, responses associated with seismic excitations outside of the subsurface volume of interest may be detected, or any combination thereof may be used in some implementations.

Turning more specifically to the FO apparatus, one implementation of this apparatus comprises a FO cable, and this disclosure will discuss the FO cable in great detail. However, those of ordinary skill in the art will appreciate that the implementations herein may be performed with practically any FO apparatus configured to perform the claimed functions. For example, one implementation of the FO apparatus may comprise at least one FO sensor or sensing portion (e.g., a single point FO sensor arrangement, a multi-point FO sensor arrangement, distributed sensing arrangement, a multiplexed arrangement, etc.). For example, in some implementations, the FO apparatus may include practically any arrangement of FO sensors or sensing portions to perform at least DAS or similar to DAS.

Returning to the FO cable, practically any FO cable may be utilized herein. For example, the FO cable may be configured to perform at least DAS. Furthermore, the FO cable may be configured to perform DPS, DTS, or any combination thereof in addition to DAS. A previously installed FO cable may already be configured to perform DAS (and optionally DPS and optionally DTS), and this previously installed FO cable may be utilized herein. Alternatively, a new FO cable configured to perform DAS (and optionally DPS and optionally DTS) may be installed. The equipment and techniques to be used to install the FO cable may depend on whether the FO cable is to be installed in a permanent, pumpable, or temporary manner, as well as the location where the FO cable is to be installed. For example, the seismic sensor installation apparatus may be utilized to install the FO cable.

The FO cable may include one or more scatterers. The FO cable may include one or more diffractors. The FO cable may include one or more reflectors. The FO cable includes one or more optical fibers used for DAS. In one implementation, an unmodified, substantially continuous length of standard optical fiber may be used, requiring little or no modification or preparation for use as a DAS optical fiber. The FO cable configured for DAS may optionally include one or more optical fibers for DPS and may optionally include one or more optical fibers for DTS. Thus, the FO cable may include at least one optical fiber that may be, but is not limited to: one or more optical fibers used for DAS, one or more optical fibers for DPS, one or more optical fibers used for DTS, or any combination thereof. The optical fibers may include multimode optical fibers, single mode optical fibers, etc.

Each DAS optical fiber of the FO cable may be optically interrogated by one or more input pulses to provide (but do not have to be) substantially continuous sensing of strain activity along its length. For example, an interrogator (e.g., an interrogator on land or a marinized interrogator in an aquatic environment) may be connected to a DAS optical fiber for the interrogation. The DAS optical fiber may be either single-mode or multimode. Optical pulses are launched into the DAS optical fiber and the radiation backscattered from within the DAS optical fiber is detected and analyzed. Backscattering (e.g., Rayleigh backscattering) analysis is used for strain measurements. By analyzing the radiation backscattered within the DAS optical fiber, the DAS optical fiber can effectively be divided into a plurality of sensing portions or points which may be (but do not have to be) substantially contiguous. Seismic excitations from seismic sources, hydrocarbon recovery processes such as fracturing, etc. cause a variation in the amount of backscatter (e.g., Rayleigh backscatter) from that portion. This variation can be detected and analyzed and used to give a measure of the acoustic spectrum intensity of disturbance of the DAS optical fiber at that portion. In some implementations, the term "acoustic" may be taken to mean any type of wave, including seismic waves and sounds from sub-Hertz to 20 KHz. Besides the intensity (amplitude) and distance, other factors that can be measured include frequency, phase, duration, and signal evolution of the transients. Raman backscattering may be utilized for temperature measurements from one or more DTS optical fibers. Fibre Bragg Grating (FBG) may be utilized for pressure measurements from one or more DPS optical fibers. As FO technology continues to develop, other options may be available and used in the implementations provided herein.

In short, the FO cable may be coupled to an apparatus that comprises an interrogator. The interrogator may be on land or on a sea surface vessel. The interrogator contains optoelectronic components. The interrogator provides light (e.g., laser light) into the FO cable and receives the backscatter energy from the FO cable. For example, the fracturing process causes strain, and the strain causes the backscatter energy from the FO cable. The interrogator may also convert the backscatter energy into arrival times and generates subsurface fiber optic data set that includes the arrival times. The subsurface fiber optic data set may be sent from the interrogator to at least one system, such as at least one computing system, for (1) receiving a subsurface fiber optic data set, (2) receiving a sensor data set, (3) constraining the subsurface fiber optic data set, (4) using models to refine the constrained subsurface fiber optic data set, (5) generating a moment tensor, (6) generating a digital seismic image. As an example, all of this functionality (1)-(6) may be performed at a first computing system on land or on the sea surface (e.g., on a sea surface vessel). As another example, the subsurface fiber optic data set may be sent from the interrogator to a first computing system on the sea surface, such as on a sea surface vessel. The subsurface fiber optic data set may then be sent from the first computing system to a second computing system on land for functionality (2)-(6). The subsurface fiber optic data set may be stored at the first computing system, the second computing system, or both. As another example, the subsurface fiber optic data set may be sent from the interrogator to a first computing system on the sea surface, such as on a sea surface vessel, for partial processing of the subsurface fiber optic data set. The partially processed subsurface fiber optic data set may be sent from the first computing system to a second computing system on land for functionality (2)-(6). The subsurface fiber optic data set may be stored at the first computing system, the second computing system, or both. As another example, the subsurface fiber optic data set may be sent from the interrogator to a first computing system on the sea surface, such as on a sea surface vessel, and the subsurface fiber optic data set may be accessed by one or more users from a second computing system on land (e.g., a user logs on remotely to the first computing system). The functionality (2)-(6) is performed on the subsurface fiber optic data set at the first computing system on the sea surface by the one or more users without sending the subsurface fiber optic data set to the second computing system on land. The subsurface fiber optic data set may also be partially processed at the first computing system on the sea surface before the one or more users on land accesses it. In some implementations, the subsurface fiber optic data set (before processing, during processing, or after processing) may be combined with other data (e.g., ground truth data, core data, etc.).

Those of ordinary skill in the art will appreciate that various modifications may be performed, for example, the functionality described for the interrogator may be divided among multiple components that are on the sea surface, under the sea surface, on land, or any combination thereof. The functionality described for the interrogator may use other components, for example, to aid in underwater optical communication, to aid communication from under the sea surface with the sea surface, etc. For example, additional elements may include marinized (i.e. designed to be submerged in a marine environment) junction boxes, a marinized data download system, wet mate connectors to allow cable splits for floating and/or weighted cables, etc. Use of an underwater optical communication system may also provide highest bandwidth data transfer over short range between a marinized data download device and a mobile underwater vehicle (ROV or AUV). Other modifications may include using high power light emitting diodes (LED) as the transmitter and a receiver, and using photo multiplexors to increase sensitivity, or alternately using focused underwater laser. There may also be additional subsea infrastructure with a FO junction box, an interrogator (e.g., marinized interrogator), or any combination thereof. A plurality of interrogators may be used in some implementations. Furthermore, DAS, DTS, and DPS interrogators may be different, and each of these may be used depending on the implementation. The functionality described for the first computing system and/or the second computing system may be divided among multiple components that are on the sea surface, under the sea surface, on land, or any combination thereof. The functionality described for the first computing system and/or the second computing system may use other components.

Turning to the structure of the FO cable, the FO cable includes at least one optical fiber that may be surrounded by at least one protective layer to shield the at least one optical fiber against the environment. One implementation of the FO cable comprises a capillary tubing (also referred to as capillary tube) to house the at least one optical fiber. The capillary tubing may be filled with a fluid, e.g., a hydrogen scavenging gel, an inert heat transfer fluid, or an inert gas. In one implementation, the filling fluid is a gel designed to scavenge hydrogen and protect the at least one optical fiber from hydrogen darkening. The gel also helps to support the weight of the at least one optical fiber within the capillary tubing. In another implementation, the capillary tubing is filled with an inert gas such as nitrogen to avoid exposure of the at least one optical fiber to water or hydrogen, thereby minimizing any hydrogen-induced darkening of the at least one optical fiber during oilfield operations. In one implementation, a single capillary tubing is used, which contains a plurality of optical fibers. In another implementation, multiple capillary tubings may be used, with each capillary tubing containing one or more optical fibers.

A variety of installation options may be utilized: permanent, pumpable, or temporary. With the pumpable option, two capillary tubings are used to enable pumping fluid to be pumped down the capillary tubing and returned to the surface. A turnaround sub with a U-tube geometry is used at the deepest wellbore placement to join the two capillary tubings and enable pumping. The viscous drag force of the pumped fluid on the at least one optical fiber enables recovery and replacement. The pumping of the at least one optical fiber may occur in a factory, controlled surface environment, or at the wellsite with the at least one optical fiber in the wellbore. The pumpable option may be used if one or two optical fibers are used. The pumpable option allows the at least one optical fiber to be recovered and replaced should it experience hydrogen darkening.

With the permanent option, at least one optical fiber is installed inside a capillary tubing in a factory or controlled environment. If a permanently installed optical fiber becomes damaged due to hydrogen darkening or thermal degradation, the recourse is a complete replacement. The permanent and pumpable options may strap or clamp the capillary tubing to the outside of casing, liners, and tubing, or installed inside a coiled tubing instrument tube.

With the temporary option, at least one optical fiber is run into a wellbore off a reeling system into the tubing or into a coiled tubing instrument tube. The coiled tubing instrument tube could be free hanging in the tubing-casing annulus or strapped to the tubing, casing, or liner. The temporary deployable optical fiber may use a small diameter FIMT (fiber in metal tube) with an outside diameter of 0.09 to 0.15 inches, which is reinforced with fiber glass, polyproylene, polyethylene, carbon fiber, or any combinations of the foregoing which encases and protects the FIMT. This temporary option is designed to be run in and out of many wellbores and installed for a few hours to a few weeks to acquire data.

Some installation options may depend on whether a wellbore is existing or new. In one implementation, for an existing wellbore, installation may be inside the liner or casing on the tubing or coiled tubing to take advantage of the preexisting structure. However, for a newly drilled wellbore, installation may be either inside or outside the liner or casing with trade-offs between cost, risk, etc.

In short, those of ordinary skill in the art will appreciate that various installation options are available. In one implementation, the capillary tubing may be attached to the outer surface of the tubing with a plurality of clamps, or any known method for coupling conduits. Further, in some implementations, it should be appreciated that the capillary tubing need not be coupled to the tubing, but it may be coupled to any other conduits in the wellbore or the casing/liner itself, or it may be integral with the casing/liner, e.g., the capillary tubing may be positioned in the annulus, clamped/strapped/fastened to any of the tubing, inside the tubing, the liner, the casing, the instrument coiled tubing, or any combination thereof. Thus, the installation scheme that is chosen may depend upon whether the wellbore is new or preexisting, components of the wellbore, etc.

FIG. 1A illustrates a schematic sectional view of a subsurface volume of interest in fluidic communication with a wellbore during a fracturing process in accordance with one implementation. Fractures may be detected using a seismic sensor 177 and a FO apparatus 178 as discussed herein. The wellbore 105 is a horizontal wellbore. The wellbore 105 includes a vertical section 110, the build section 112, and a horizontal section 115. The area between the vertical section 110 and the horizontal section 115 is referred to as the heel and the area towards the end of the horizontal section 115 is referred to as the toe. For example, unconventional reservoirs may be produced using horizontal wellbores, such as the wellbore 105.

The wellbore 105 may be drilled with drilling apparatus 113 through the subsurface volume of interest 101. The drilling apparatus 113 may include a drill bit, a drill string, etc. The drilling apparatus 113 may be utilized to drill at least one other wellbore, drill at least one other track, or any combination thereof. The wellbore 105 may be cemented as illustrated by cement 106. The wellbore 105 may include a surface casing 120 along a portion of the wellbore 105, a production casing 125 along a portion of the wellbore 105, and a liner 130 (e.g., a slotted liner) attached by at least one liner hanger 132. The wellbore 105 may also include a tubing 145 within the surface casing 120, the production casing 125, and the liner 130. The tubing 145 may be of standard sizes known in the industry (e.g., outermost diameter of 2⅜ inches to 4.5 inches) for standard and commonly known casing sizes (e.g., outermost diameter of 4½ inches to 12 inches), each of which have lengths in the tens to hundreds of feet. The tubing 145 includes a plurality of tubulars tubing joints, pup joints, packers (e.g., may include centralizers), etc. The end of the tubing 145 (e.g., at the toe) includes a bull plug 150. At least one packer 170 may be located in an annulus 169 between the tubing 145 and the liner 130. A control apparatus 114 may control fluid flow into the wellbore 105. The control apparatus 114 may also control fluid flow out of the wellbore 105.

In operation, the wellbore 105 may be utilized for fracturing, including opening existing fractures and/or creating fractures, that lead to fractures 50 in the subsurface volume of interest 101. For example, a perforation apparatus may be deployed in a desired location in the wellbore 105 to generate perforations through one or more layers of the wellbore 105, and then a fracturing apparatus 116 may be used to open and/or create the fractures 50. Fracturing may occur in stages in some implementations. After flowback, the hydrocarbons from the subsurface volume of interest 101 flow into the wellbore 105 through one or more of the fractures 50 and up towards the surface 140 for refining, transporting, etc. Subsurface events, such as opening existing fractures and/or creating fractures in a subsurface volume of interest 101, generate seismic excitations. The FO cable 178 detects the strain resulting from the seismic excitations and the seismic sensor 177 detects strain and/or subsurface energy that may be received by geophones, hydrophones, and/or other seismic sensors. In some implementations, the seismic excitations, such as caused by the fracturing, may be detected in real-time or near real-time. The seismic sensor 177 and the FO cable 178 may be installed with a seismic sensor installation apparatus 179 (illustrated in FIGS. 1B, 2A-1, 2A-2, 2B-1, 2B-2, 2C-1, 2C-2, 2D-1, and 2D-2).

Figure 1B:
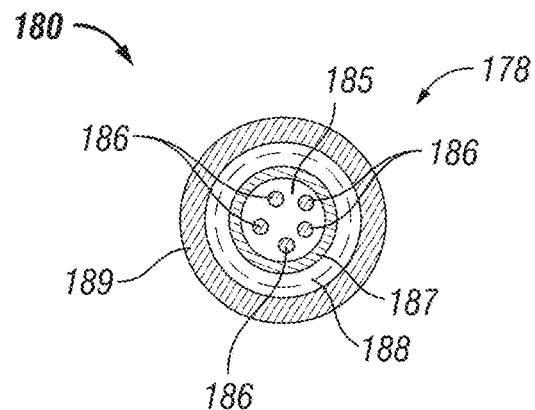
FIG. 1B illustrates an expanded view, in cross-section, of capillary tubing, in accordance with one or more implementations.

FO Cable—Capillary Tubing:

FIG. 1B illustrates an expanded view, in cross-section, of the capillary tubing 180. The capillary tubing 180 is one implementation of the FO cable 178, however, those of ordinary skill in the art will appreciate that there are other designs and the appended claims are not limited to any disclosed implementations. The capillary tubing 180 may have a length of tens of feet to hundreds of feet. For example, the capillary tubing 180 may be a portion of the length or the entire length of the wellbore 105. The outer diameter of the capillary tubing 180 may be about ⅛ inches to about ⅜ inches. The outer diameter of the capillary tubing 180 may be about ¼ inches. The dimensions of the capillary tubing 180 may vary as long as the responses to seismic excitations may be detected to generate subsurface fiber optic data set 334.

Starting from the inside, the capillary tubing 180 includes a core 185 comprised of a first protective layer that is typically of an Inconel® or Incoloy® alloy 25, a stainless steel, or any combination thereof with at least one optical fiber 186 with at least one sensing portion inside the core 185. One or more of the optical fibers 186 is a DAS optical fiber, but other sensing capabilities, such as DPS, may be available in some implementations. The optical fibers 186 may have high temperature coatings and coating combinations, including polyimide, high temperature acrylates, silicone-PFA, hermetic carbon, or any combination thereof to prevent hydrogen darkening. The core 185 may be filled with fluid, and the fluid surrounds each optical fiber 186. The fluid may be a gel or inert gas as discussed hereinabove. The inner diameter of the core 185 may be about 0.05 inches to about 0.10 inches. The combination of the first protective layer and the optical fiber(s) is commonly referred to as a FIMT or fiber in metal tube. The length of the core 185 depends on the length of the capillary tubing 180.

Adjacent to the core 185 may be an optional second protective layer 187, which may be of a metallic material such as aluminum. The diameter of the second protective layer 187 is optional, but may be about 0.10 inches to about 0.20 inches. The length of the second protective layer 187 depends on the length of the capillary tubing 180.

Adjacent to the optional second protective layer 187 may be a third protective layer 188, which may be of a metallic material (e.g., Inconel® or Incoloy® alloy 25, a stainless steel, or any combination thereof). The diameter of the third protective layer 188 may be about 0.20 inches to about 0.40 inches. The length of the third protective layer 188 depends on the length of the capillary tubing 180.

Adjacent to the third protective layer 188 may be an encapsulation protective layer 189, which is an extruded encapsulation polymer (e.g., polyethylene, polypropylene, Teflon™ brand, Hypalon™ brand, or any combination thereof). The diameter of the encapsulation protective layer 189 may be about 0.25 inches to about 0.75 inches. The length of the encapsulation protective layer 189 depends on the length of the capillary tubing 180.

Figures 1, 2A:
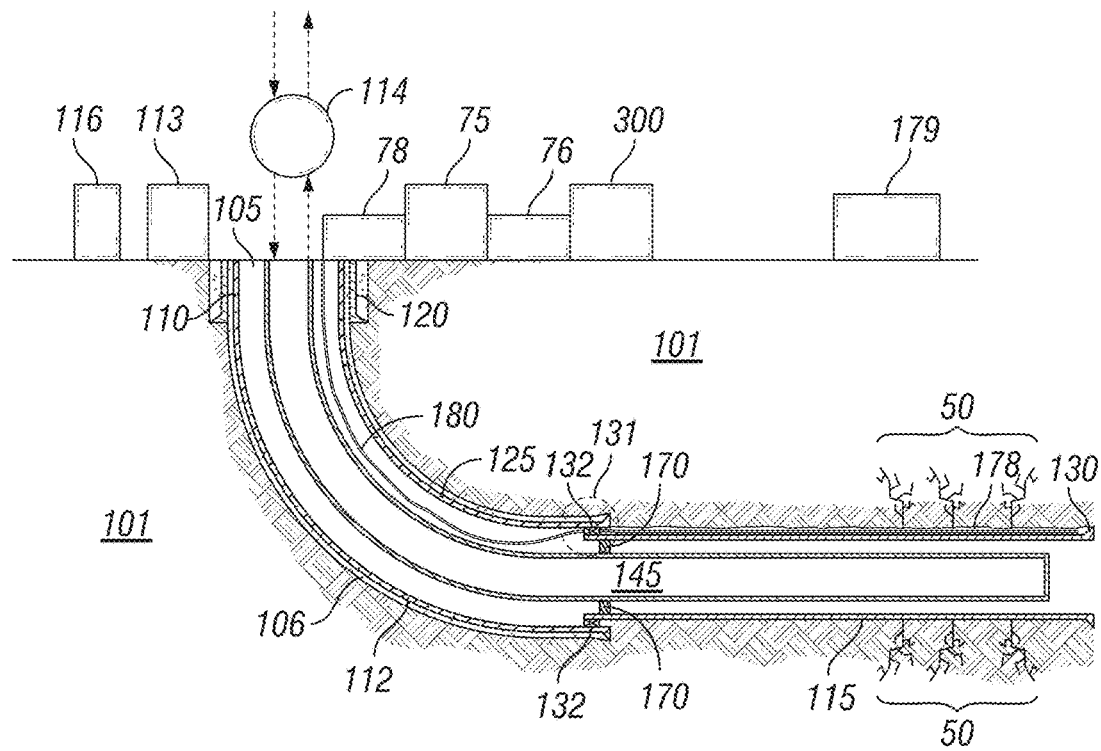
FIG. 2A-1 illustrates a hydraulic wet connect at liner top with capillary tubing being clamped to tubing above the liner top, in accordance with one or more implementations.
Figures 2, 2A:
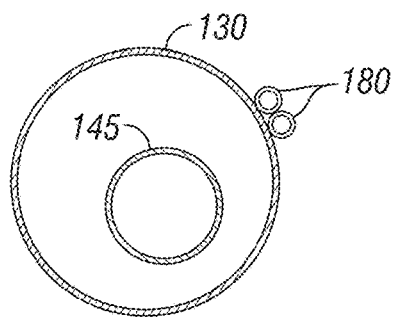

FO Cable—Capillary Tubing Clamped to Liner:

FIGS. 2A-1 and 2A-2 illustrate an implementation with a hydraulic wet connect at liner top 131 with the capillary tubing 180 being clamped to the tubing 145 above the liner top 131. There may be one or more of the capillary tubing 180. In the implementation of FIGS. 2A-1 and 2A-2, the capillary tubing 180 may be installed outside of the liner 130 in the horizontal section 115 of the wellbore 105, and clamped on the tubing 145 in the vertical section 110. The optical fiber 186 of FIG. 1E (e.g., the DAS fiber, etc.) may be permanently installed in the capillary tubing 180 or can be pumped and retrieved through pumping to/from the capillary tubing 180. The hydraulic wet connect is used to connect the optical fiber 186 in the horizontal section 115 and the vertical clamped section 110. The tubing 145 can be run in and out of the wellbore without damaging the optical fiber 186 in the horizontal section 115. This setup may include at least one packer 170.

Figures 1, 2B:
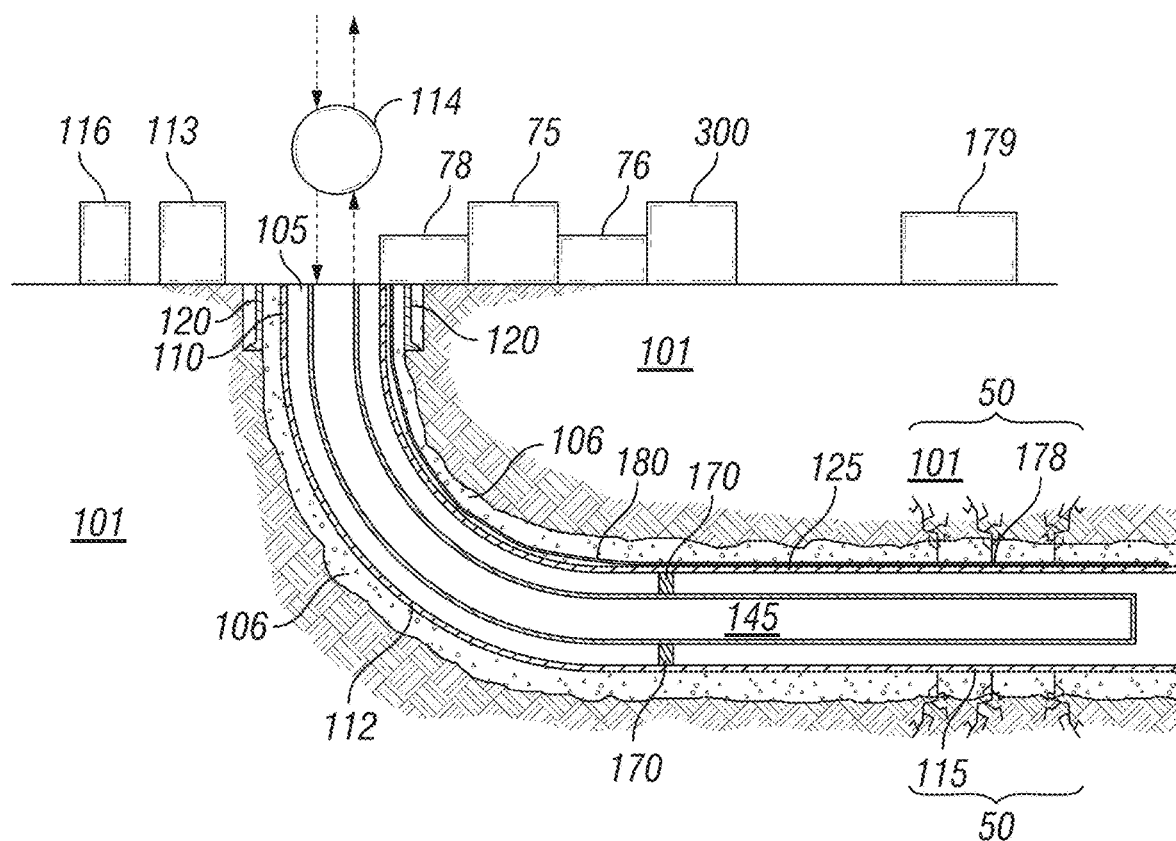
Figures 2, 2B:
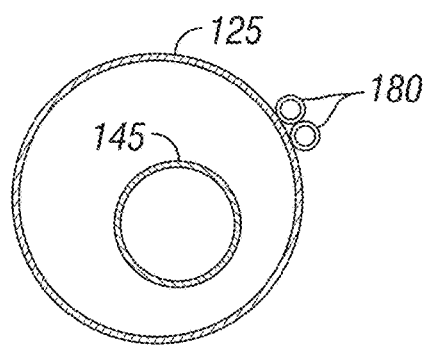

FO Cable—Capillary Tubing Clamped to Casing:

FIGS. 2B-1 and 2B-2 illustrate an implementation in which the capillary tubing 180 may be clamped to the casing, such as the production casing 125. There may be one or more of the capillary tubing 180. The installation scheme of FIGS. 2B-1 and 2B-2 is similar to the liner deployed surveillance scheme of FIGS. 2A-1 and 2A-2. As illustrated, the complete system is installed outside of the casing 125. The capillary tubing 180 is clamped to the casing 125 as the casing 125 is installed into the wellbore 105. The optical fiber 186 may be retrieved and replaced when designed with the pumpable option. In another implementation, a single capillary tubing 180 may be run with single or multiple permanent optical fibers 186. The perforations may be shot 180 degrees away from the capillary tubing 180. The capillary tubing 180 may be run with ½ inch steel cables on either side of the ¼ inch capillary tubing 180 to facilitate electro-magnetic orienting of perforating guns. This setup may include at least one packer 170.

Figures 1, 2C:
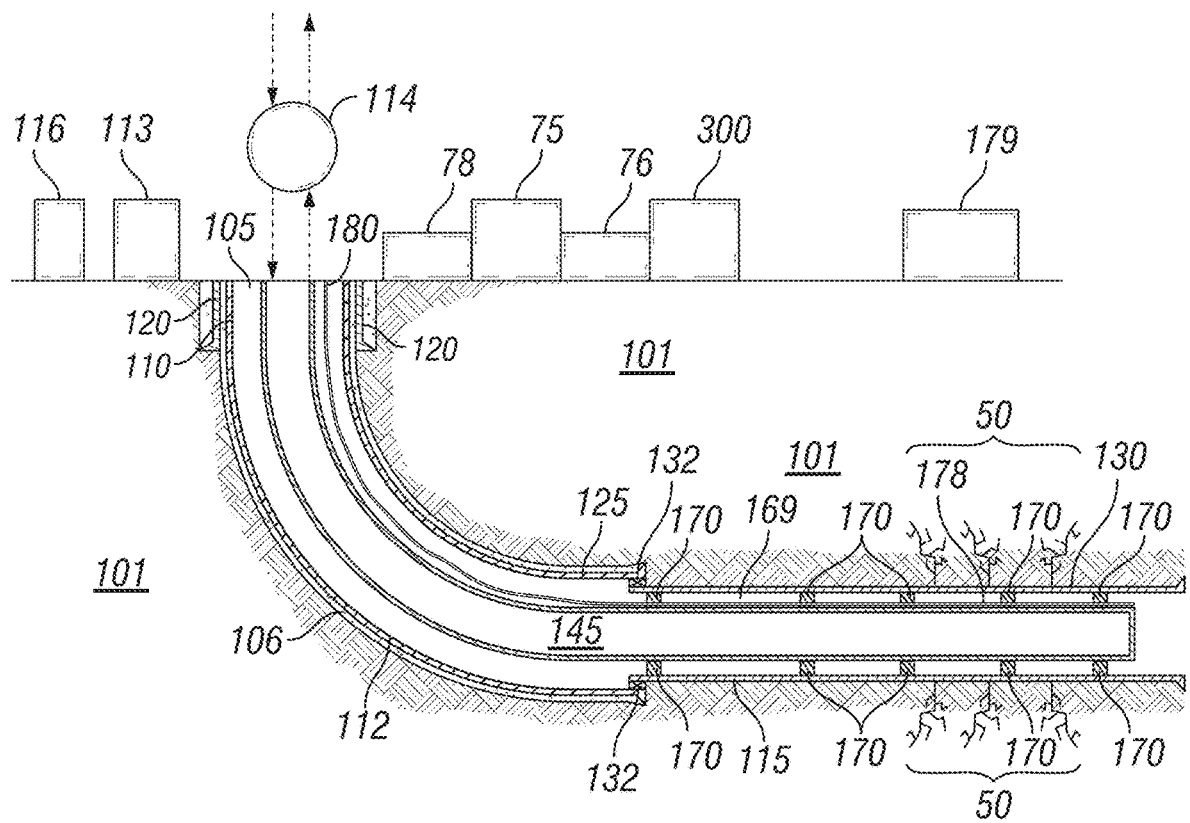
Figures 2, 2C:
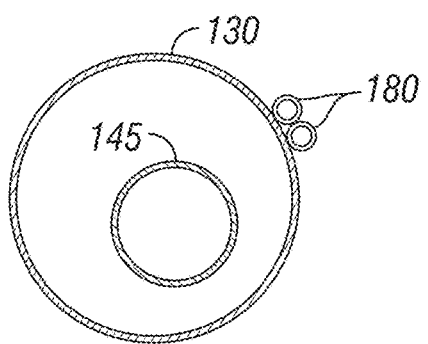

FO Cable—Capillary Tubing Clamped to Tubing:

FIGS. 2C-1 and 2C-2 illustrate an implementation in which the capillary tubing 180 may be clamped to the tubing 145. There may be one or more of the capillary tubing 180. In one implementation of this scheme, the capillary tubing 180 is only clamped on the tubing 145 and no other component. In another implementation, the capillary tubing 180 may be installed inside the tubing 145. The installation scheme in this setup is flexible, which facilitates the changes in the optical fiber 186 design and specifications. Additionally, the optical fiber 186 and capillary tubing 180 are retrievable. This setup may include at least one packer 170, and the capillary tubing 180 may penetrate through each packer 170.

Figures 1, 2D:
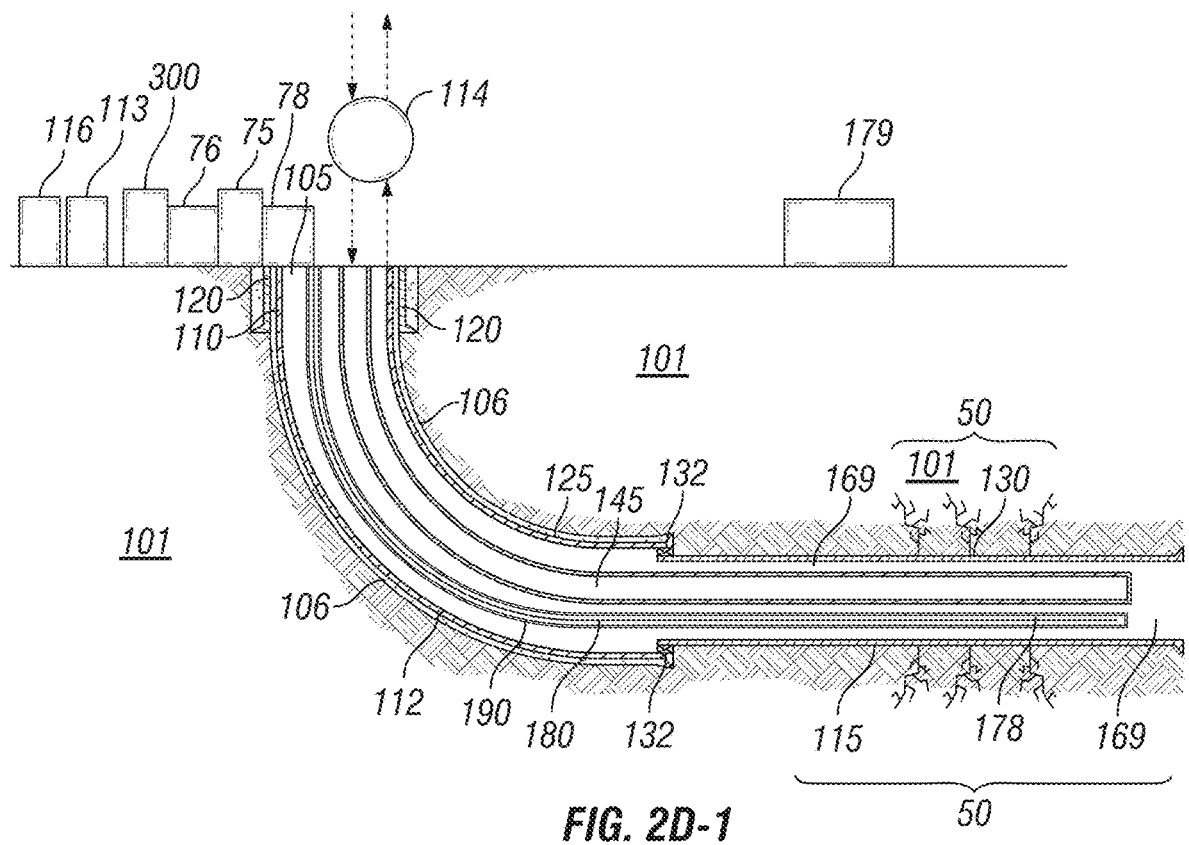
Figures 2, 2D:
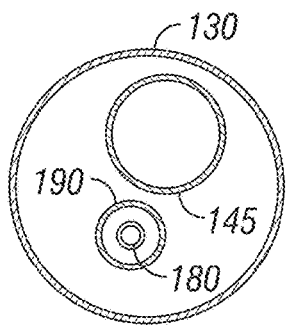

FO Cable—Capillary Tubing inside Instrument Coiled Tubing:

FIGS. 2D-1 and 2D-2 illustrate an implementation in which the capillary tubing 180 may be positioned within an instrument coiled tubing 190. There may be one or more of the capillary tubing 180. In one implementation, the scheme of FIGS. 2D-1 and 2D-2 is used as a temporary surveillance method (e.g., for a few days) so there is less chance of fiber degradation and capillary tubing corrosion. In another implementation, the scheme works best with a larger size of liner 130 or casing 125 to avoid damage to the optical fiber 186 and sticking in the wellbore 105. The scheme of FIGS. 2D-1 and 2D-2 is flexible, allowing retrieval of optical fiber 186/capillary tubing 180. This setup may not include any packers 170.

The FO cable 178 of each of FIGS. 2A-1, 2A-2, 2B-1, 2B-2, 2C-1, 2C-2, 2D-1, and 2D-2 may be coupled to an interrogator 75 by a connection 78, such as a wired connection. The interrogator 75 may be coupled to at least one computing system 300 by a connection 76, such as a wired connection or even a wireless connection.

FIGS. 1A, 1B, 2A-1, 2A-2, 2B-1, 2B-2, 2C-1, 2C-2, 2D-1, and 2D-2 are not necessarily drawn to scale and those of ordinary skill will appreciate that various modifications may be made. For example, dimensions, materials, components, connectors, etc. may be based on compatibility with the conditions on and under the surface 140. Some modifications may also be found in U.S. Patent App. Pub. Nos. 2016/0281471 (Attorney Dkt. No. T-10077), 2016/0281494 (Attorney Dkt. No. T-10089), and 2016/0281456 (Attorney Dkt. No. T-10242), each of which is incorporated by reference in its entirety. A discussion of fiber optics in a marine environment is provided in U.S. Patent App. Pub. No. 2018/0100939 (Attorney Dkt. No. T-10466), which is incorporated by reference in its entirety. An additional discussion of fiber optics is provided in U.S. Patent App. Pub. No. 2018/0031734 (Attorney Dkt. No. T-10258) and U.S. patent application Ser. No. 15/926,700 (T-10476), each of which is incorporated by reference in its entirety.

Figure 3:
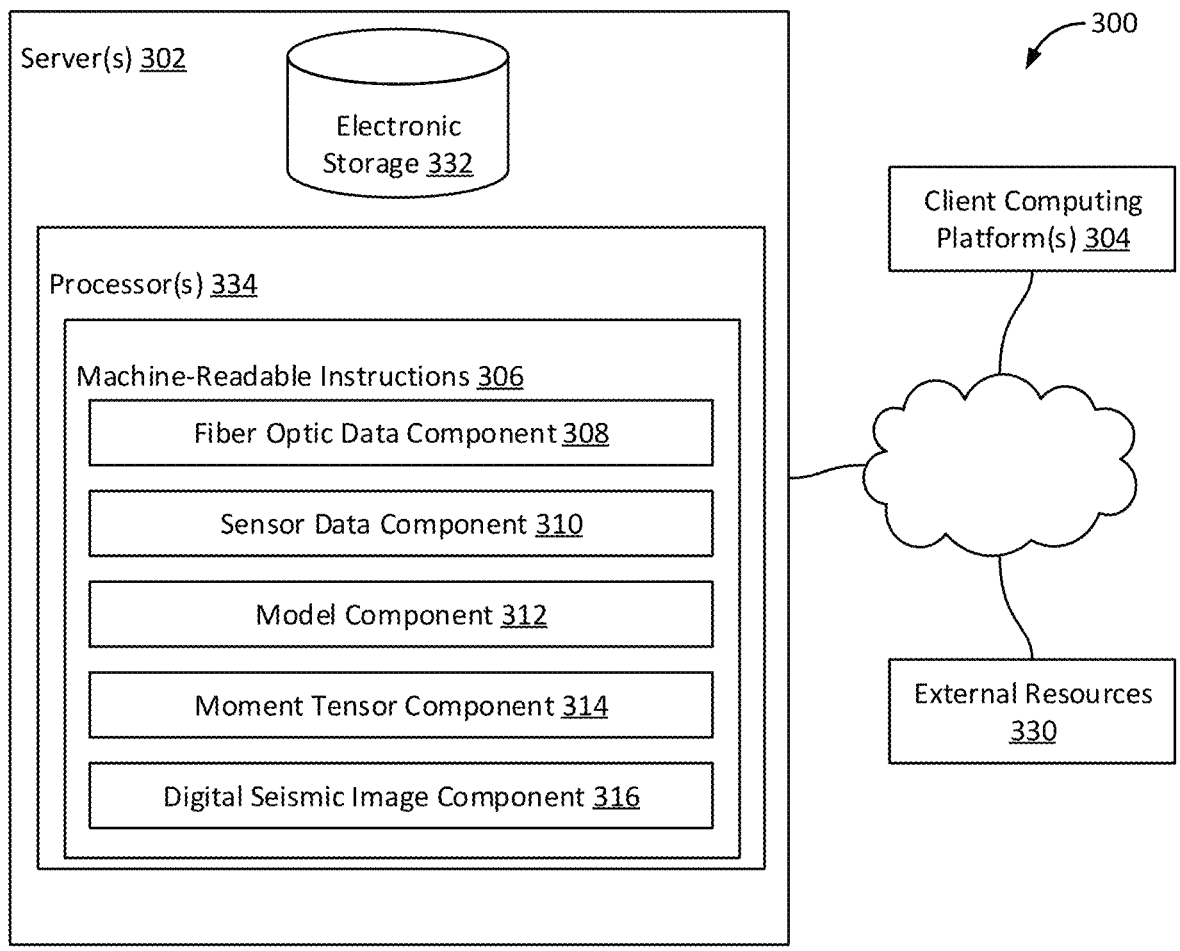
FIG. 3 illustrates a system configured for detecting a subsurface event, in accordance with one or more implementations.

Computing System:

FIG. 3 illustrates a system 300 configured for detecting a subsurface event using, in accordance with one or more implementations. In some implementations, system 300 may include one or more servers 302. Server(s) 302 may be configured to communicate with one or more client computing platforms 304 according to a client/server architecture and/or other architectures. Client computing platform(s) 304 may be configured to communicate with other client computing platforms via server(s) 302 and/or according to a peer-to-peer architecture and/or other architectures. Users may access system 300 via client computing platform(s) 304.

Server(s) 302 may be configured by machine-readable instructions 306. Machine-readable instructions 306 may include one or more instruction components. The instruction components may include computer program components. The instruction components may include one or more of a fiber optic data component 308, a sensor data component 310, a model component 312, a moment tensor component 314, a digital seismic image component 316, and/or other instruction components.

Fiber optic data component 308 may be configured to receive a subsurface fiber optic data set of the given subsurface event using a fiber optic apparatus. The fiber optic apparatus may include fiber optic sensors, fiber optic cables, and/or other implementations of fiber optics.

In implementations, the fiber optic apparatus may form a distributed acoustic sensing cable. A given subsurface fiber optic data may specify parameter values of parameters as a function of position of the fiber optic apparatus located in the subsurface volume of interest. Parameters may include original measurements such as strain, strain rate, change in temperature, arrival times, and derived properties such as coherency, semblance, event magnitudes, event locations, origin times, and/or other parameters. For example, strain rate in a fiber optic cable may indicate physical deformation to the fiber optic cable with respect to time.

In some implementations, a subsurface event may include shifting of tectonic plates, movement of subsurface features, human activities generating energy directed into a subsurface region, fault movements, s waves, p waves, and/or other events.

In implementations, fiber optic data component 308 may be configured to denoise raw data to generate a subsurface fiber optic data set, remove artifacts from the raw data, or otherwise preprocess the raw data. In some implementations, Fourier domain enhancement and/or machine-learning based Wiener filter may be used to preprocess the raw data. In some implementations, a short term average (STA) and/or a long term average (LTA) may be used to prefilter the subsurface fiber optic data set. In implementations, the STA and LTA may prefilter the subsurface fiber optic data set to limit the subsurface fiber optic data set to potential subsurface events, or event candidates. For example, a STA of the subsurface fiber optic data set divided by a LTA of the subsurface fiber optic data set may be about 1 when no subsurface event is present. When there are spikes in the subsurface fiber optic data set, corresponding to a potential subsurface event, the STA may vary significantly from the LTA. When the STA/LTA deviates from about 1 (over some threshold value, which may be, for example, about 0.1, 0.25, 0.5, etc. from about 1), this technique may be used to prefilter the subsurface fiber optic data set to remove data that has a ST/LTA of about 1.

In some implementations, fiber optic data component 308 may be configured to constrain the subsurface fiber optic data set based on a given parameter value of a given parameter within a certain range to generate a constrained subsurface fiber optic data set. In some implementations, the given parameter may be the origin time. In one example, the subsurface fiber optic data set is scanned based on apex times. The subsurface fiber optic data set corresponding to the scanned apex times may be the constrained subsurface fiber optic data set. The range may be user defined or based on machine learning trained on other subsurface data.

In some implementations, fiber optic data component 308 may be configured to update the event origin time based on a refined subsurface fiber optic data set, as described herein. In implementations, propagation time may be removed from the updated event location which may align subsurface wiggles of different receivers, or one or more sensors, at an origin time of a given subsurface event. The traces corresponding to the refined subsurface fiber optic data set with updated event locations may be steered, stacked, and/or otherwise modified to find a maximum timing point to generate an updated origin time.

Sensor data component 310 may be configured to receive a sensor data set of the given subsurface event using one or more sensors. The one or more sensors may include a fiber optic apparatus, a geophone, a hydrophone, and/or other sensors implemented in, or around, a subsurface volume of interest. In implementations, the one or more sensors may be positioned adjacent to the fiber optic apparatus, in, or around, a well, co-located with the fiber optic apparatus, and/or other locations in the subsurface volume of interest. A given subsurface sensor data may specify parameter values of parameters as a function of position within the subsurface volume of interest.

Generally, a depth may be assumed for the subsurface events using the refined subsurface fiber optic data set based on nearby drilling operations, local geological settings or other known events. In some implementations, the sensor data set may further refine a location of a subsurface event. In implementations, the sensor data set may be used to provide directionality to the subsurface fiber optic data set. The directionality may be obtained by analyzing polarizations of P, SH, and/or SV waves from an event. Examples of such polarization analysis methods may include eigenvalue decomposition, back-azimuth projection, principle component analysis, etc., and may be generally referred to as hodogram analysis in exploration geophysics. It should be appreciated that this list is not exhaustive and other polarization analysis methods may be used. For example, using a simple velocity model, a potential refined location of the subsurface event may correspond to a ring around the fiber optic apparatus that detected the subsurface event. Each point on the ring may correspond to a potential location of the subsurface event because the subsurface fiber optic data set may not have appropriate directionality and/or polarity to distinguish from which direction the subsurface fiber optic data set is detected, as shown on the left column of FIG. 21. With a subsurface sensor data set (not illustrated), the directionality of arrivals may be obtained, and may be used to determine a unique point on the ring.

Figure 21:
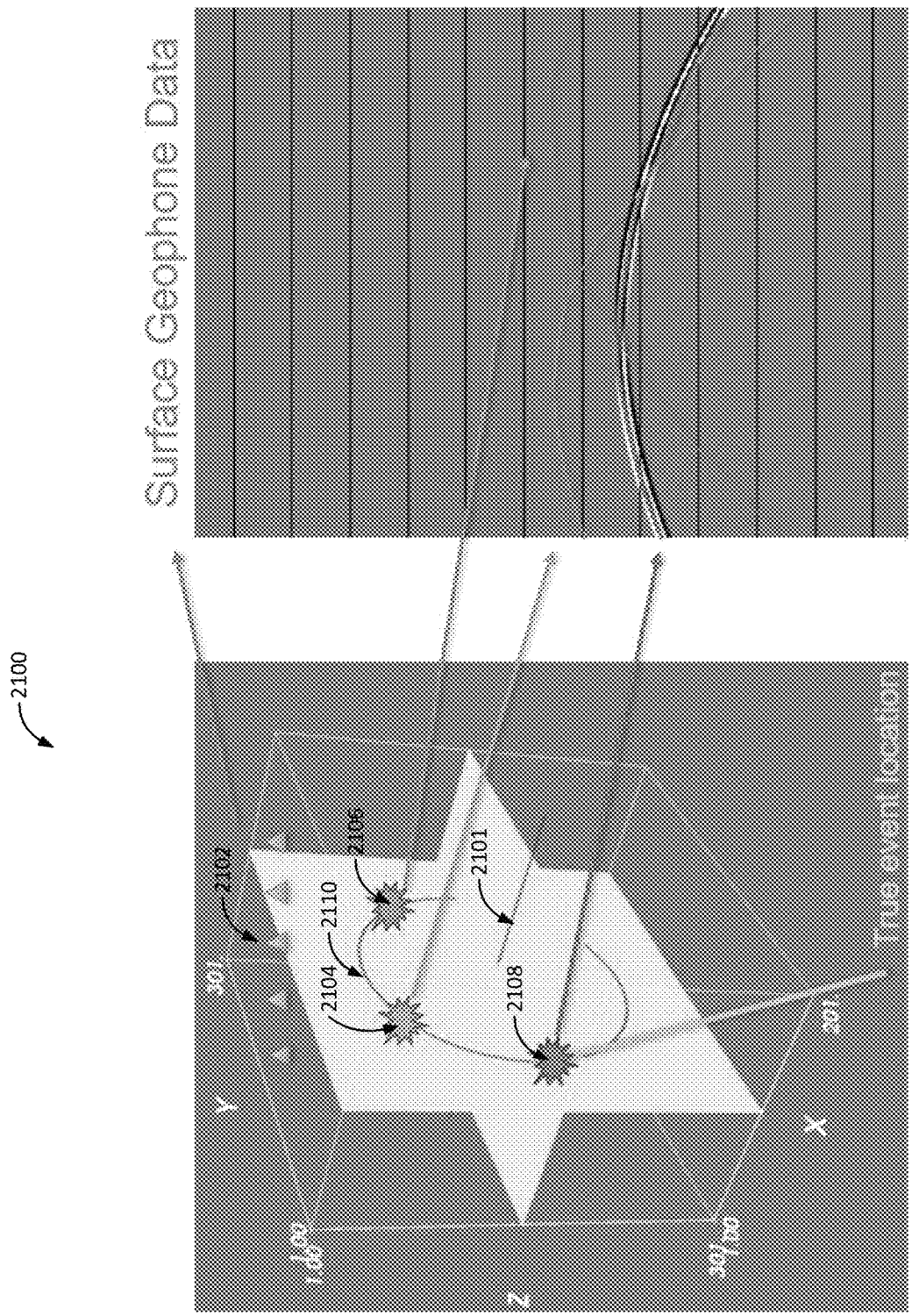
FIG. 21 illustrates example event candidates using a fiber optic apparatus and one or more geophones, in accordance with one or more implementations.

In some implementations, a sensor data set may further refine a location of a subsurface event. With potential locations derived from the subsurface fiber optic data set, traveltimes from each potential location to the sensors may be generated and/or obtained. For example, three potential event locations and their corresponding traveltimes in the sensor data set are illustrated in FIG. 21. The correct location leads to traveltimes that match the sensor data set. The fitting of the traveltimes and the sensor data set can be evaluated by using semblance analysis. For example, an event location that matches both the sensor data and the corresponding subsurface fiber optic data may have the highest semblance in the sensor data set. For example, this may include an x-y-z position in the subsurface volume of interest. It should be appreciated that different semblance values may be selected for different applications.

In some implementations, the sensor data set may be used to derive a wavespeed structure.

Model component 312 may be configured to use sets of models to refine the constrained subsurface fiber optic data set to generate a refined subsurface fiber optic data set. In some implementations, refining the constrained subsurface fiber optic data set may include one or more stages. A first set of models may represent the first stage of refining the constrained subsurface fiber optic data set. In implementations, a first set of models may include a multiple signal classification model and a semblance-based model. Both the multiple signal classification model and the semblance-based, or coherency-based model may, for example, help determine a location of emitters.

In some implementations, model component 312 may be configured to generate sets of probability maps of a given subsurface event. Using the first set of models, a first probability map may be generated from the multiple signal classification model, and a second probability map may be generated from the semblance-based model. The probability map may be a spatial distribution of the probability of a subsurface event. A spatial location that maximizes the values for the probability maps may be used in the first stage of refining the constrained subsurface fiber optic data set when the corresponding semblance value is greater than a threshold semblance value. The semblance value may be a measure of coherence of multiple channels, or, for example, probability maps. In some implementations, the threshold semblance value may be user defined or based on machine learning trained on other subsurface data. For example, the threshold semblance value may be approximately 0.4 (semblance value ranges from 0 to 1) for a high-quality dataset. But if the signal-to-noise ratio is too low, the threshold may be as low as 0.1 to make sure small events are not excluded at the very beginning. The first stage of refining may limit the constrained subsurface fiber optic data set into a limited subsurface fiber optic data set. The limited subsurface fiber optic data set may include estimated origin times based on the scanned apex times. In some implementations, a simple velocity model may be applied to the semblance-based model to improve processing efficiency, as fine-tuning the velocity model at this point may provide minimal improvement in accuracy. For example, for a typical SH-wave, the RMS velocity may be about 8,000 ft/s. It should be appreciated that different values may be selected based on different wave types and local geological settings.

In an example description of semblance analysis, channels from a data set may be stacked together. In the case where the data is the same in all channels, semblance would be 1. Where there are differences between the data, semblance would be less than 1. The lowest semblance value may be 0. In order to determine which data value has the highest semblance, characteristics of the data may be leveraged (e.g., hyperbolic characteristic for velocity in seismic traces). Each data may be corrected for shifts based on the one or more sensors used to detect the data set. The amplitudes of the data can be stacked and normalized. Semblance values may be derived from the data. The highest semblance value may correspond to a data value.

Amplitude of stacked data may be defined by $$s_t = \sum_{i=1}^{n} w_{i,t}$$

where $s_t$ may represent an amplitude of stacking, n may represent the number of NMO corrected, or otherwise corrected, traces, w may represent the amplitude value, t may represent time, and i may represent the i-th trace. The normalized amplitude may be defined by $$ns_t = \frac{|s_t|}{\sum_{i=1}^{n} |w_{i,t}|}$$

The semblance based on the amplitudes may be defined by $$\text{semblance} = \frac{1}{n} \frac{\sum_{t} s_t^2}{\sum_{t} \sum_{i} w_{i,t}^2}$$

In implementations, model component 312 may be configured for a second stage of refining the constrained subsurface fiber optic data set by applying a second set of models to the limited subsurface fiber optic data set. The second set of models may include an interferometry model and a time reversal model. The interferometry model may use superimposed waves to extract information based on the relationship of the waves. The time reversal model may take advantage of the reciprocity of wave propagation to update an estimated location of a subsurface event and/or other information.

In some implementations, applying the interferometry model to the limited subsurface fiber optic data set may include binning the limited subsurface fiber optic data set, or otherwise separating and grouping the limited subsurface fiber optic data set. Cross-correlations may be calculated for individual bins of the limited subsurface fiber optic data set.

Cross-correlations may be between a reference subsurface fiber optic data in a selected bin and other subsurface fiber optic data set from the limited subsurface fiber optic data set. Cross-correlating the binned limited subsurface fiber optic data set may include migrating, or shifting, traces to the given subsurface volume of interest based on a shift, such as a phase shift, between the reference trace and the other traces from the limited subsurface fiber optic data set. Migrating traces may be based on traveltime differences. A trace may be a single subsurface fiber optic data. In some implementations, the traces may be migrated according to different interferometry models, such as a Kirchhoff-based interferometry model.

In some implementations, the migrated traces may form a partial digital seismic image based on the subsurface fiber optic data in a given bin. The correlation, or multiplication, of the partial digital seismic images may resolve vertical resolution issues often found in other interferometric methods. The partial digital seismic images may be combined using a hybrid imaging system capable of properly combining partial digital seismic images. Previous systems have been unable to properly combine partial digital seismic images. The combined digital seismic image may be used to generate an updated location In some implementations, applying the time reversal model to the limited subsurface fiber optic data set may include muting traces that are not included in the limited subsurface fiber optic data set. Applying the time reversal model to the limited subsurface fiber optic data set may include normalizing the remaining traces and using the absolute value as input. Applying the time reversal method to the limited subsurface fiber optic data set may generate an updated location.

In implementations, refining the limited subsurface fiber optic data may include determining whether the updated location of the limited subsurface fiber optic data set using the interferometry model and the updated location of the limited subsurface fiber optic data set using the time reversal model are within a threshold spatial value. The threshold spatial value may be user defined or based on machine learning trained on other subsurface data. For example, the threshold spatial value may be approximately 70% of the maximum spatial value to remove some false-positive events. The refined subsurface fiber optic data set includes the limited subsurface fiber optic data set within the threshold spatial value. The threshold spatial value may be user defined or based on machine learning trained on other subsurface data.

In implementations, an origin time may be estimated and/or updated. The origin time, arrival time, and propagation time may be related as arrival time can equal origin time plus propagation time. The origin time may then be determined as a function of arrival time and propagation time. The one or more sensors may record, or otherwise detect, arrival times of the subsurface events. Propagation time may be a function of the velocity model and event location. For example, the propagation time may be a distance between the event location and the one or more sensors divided by the velocity. Using the estimated location from the refined subsurface fiber optic data set, an origin time can be estimated.

In some implementations, model component 312 may be configured to obtain and/or generate velocity models. Simple velocity models may be appropriate for many use cases. For these cases, a homogeneous RMS velocity model may be used for fast-tracking purposes. In some implementations, well data, which may include well logs, may be used to generate a velocity model. The velocity model may be used to perform ray tracing between the corresponding sensor and one or more positions in the subsurface volume of interest that may correspond to a subsurface event. The ray tracing output may be used as input for a traveltime table to determine an amount of time that has elapsed between the subsurface event and the one or more sensors detecting the subsurface event.

Moment tensor component 314 may be configured to generate a moment tensor corresponding to the given subsurface event using the refined subsurface fiber optic data set and the sensor data set. In implementations, the sensor data set may include generating an initial estimate of the moment tensor values based on the refined subsurface fiber optic data set and the sensor data set. In some implementations, the sensor data set may include updating the initial estimate of the moment tensor values based on the updated location. Moment tensors may be a representation of a fault movement, including the fault geometry and a slip vector. Moment tensors may include 9 components. Each component may correspond to one basic mode, a force couple seismic source. 6 components of the moment tensor may be independent, while the other 3 are dependent based on angular moment conservation.

In some implementations, the initial estimate of the moment tensor may be based on the refined subsurface fiber optic data set, sensor data set, a wavespeed structure, root mean square (RMS) velocity, an analytical Green Tensor, and/or other information. For example, less complex systems, such as analytical Green Tensor in homogeneous isotropic medium may be used for a quick turn-around estimation.

In some implementations, using the initial estimate of the moment tensor and the wavespeed structure, a non-linear problem may be solved to update an event location of the moment tensor.

In some implementations, using the updated event location, a linear problem may be solved to update the moment tensor based on the Green Tensor calculated in a complex wavespeed structure using modeling. The modeling may include finite difference modeling and/or other models. The sensor data set may include additional information relating to polarity, direction, data from other sources in the subsurface volume of interest, and/or other information.

In implementations, the sensor data set may include repeating the steps of updating an event location and updating the moment tensor until the difference between subsequent moment tensor values drops below a threshold moment tensor value. The threshold moment tensor value may be user defined or based on machine learning trained on other subsurface data. For example, the threshold moment tensor value may be approximately 5% of the absolute moment tensor value. In other words, if the relative change of the moment tensor is less than 5%, iterations can be safely terminated.

Digital seismic image component 316 may be configured to generate a digital seismic image that represents the moment tensor and the refined subsurface fiber optic data set using visual effects to depict at least a portion of the moment tensor and at least a portion of the parameter values in the refined subsurface fiber optic data set as a function of position within the subsurface volume of interest.

Digital seismic image component 316 may be configured to generate a digital seismic image that represents the subsurface fiber optic data set, the limited subsurface fiber optic data set, the refined subsurface fiber optic data set, and/or any other portion of the subsurface fiber optic data set, as well as the sensor data set.

In some implementations, digital seismic image component 316 may be configured to display the digital seismic image on a graphical user interface. In some implementations, the graphical user interface may be configured to perform further analysis on the final detection and location results. For example, certain event detections, or data within the subsurface fiber optic data set, limited subsurface fiber optic data set, refined subsurface fiber optic data set, or subsurface data set may be manually removed using the graphical user interface, as will be described herein.

In some implementations, server(s) 302, client computing platform(s) 304, and/or external resources 330 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 302, client computing platform(s) 304, and/or external resources 330 may be operatively linked via some other communication media.

A given client computing platform 304 may include one or more processors configured to execute computer program components. The computer program components may be configured to enable an expert or user associated with the given client computing platform 304 to interface with system 300 and/or external resources 330, and/or provide other functionality attributed herein to client computing platform(s) 304. By way of non-limiting example, the given client computing platform 304 may include one or more of a desktop computer, a laptop computer, a handheld computer, a tablet computing platform, a NetBook, a Smartphone, a gaming console, and/or other computing platforms.

External resources 330 may include sources of information outside of system 300, external entities participating with system 300, and/or other resources. In some implementations, some or all of the functionality attributed herein to external resources 330 may be provided by resources included in system 300.

Server(s) 302 may include electronic storage 332, one or more processors 334, and/or other components. Server(s) 302 may include communication lines, or ports to enable the exchange of information with a network and/or other computing platforms. Illustration of server(s) 302 in FIG. 3 is not intended to be limiting. Server(s) 302 may include a plurality of hardware, software, and/or firmware components operating together to provide the functionality attributed herein to server(s) 302. For example, server(s) 302 may be implemented by a cloud of computing platforms operating together as server(s) 302.

Electronic storage 332 may include non-transitory storage media that electronically stores information. The electronic storage media of electronic storage 332 may include one or both of system storage that is provided integrally (i.e., substantially non-removable) with server(s) 302 and/or removable storage that is removably connectable to server(s) 302 via, for example, a port (e.g., a USB port, a firewire port, etc.) or a drive (e.g., a disk drive, etc.). Electronic storage 332 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 332 may include one or more virtual storage resources (e.g., cloud storage, a virtual private network, and/or other virtual storage resources). Electronic storage 332 may store software algorithms, information determined by processor(s) 334, information received from server(s) 302, information received from client computing platform(s) 304, and/or other information that enables server(s) 302 to function as described herein.

Processor(s) 334 may be configured to provide information processing capabilities in server(s) 302. As such, processor(s) 334 may include one or more of a digital processor, an analog processor, a digital circuit designed to process information, an analog circuit designed to process information, a state machine, and/or other mechanisms for electronically processing information. Although processor(s) 334 is shown in FIG. 3 as a single entity, this is for illustrative purposes only. In some implementations, processor(s) 334 may include a plurality of processing units. These processing units may be physically located within the same device, or processor(s) 334 may represent processing functionality of a plurality of devices operating in coordination. Processor(s) 334 may be configured to execute components 308, 310, 312, 314, 316, and/or other components. Processor(s) 334 may be configured to execute components 308, 310, 312, 314, 316, and/or other components by software; hardware; firmware; some combination of software, hardware, and/or firmware; and/or other mechanisms for configuring processing capabilities on processor(s) 334. As used herein, the term "component" may perform the functionality attributed to the component. This may include one or more physical processors during execution of processor readable instructions, the processor readable instructions, circuitry, hardware, storage media, or any other components.

It should be appreciated that although components 308, 310, 312, 314, and 316 are illustrated in FIG. 3 as being implemented within a single processing unit, in implementations in which processor(s) 334 includes multiple processing units, one or more of components 308, 310, 312, 314, and/or 316 may be implemented remotely from the other components. The description of the functionality provided by the different components 308, 310, 312, 314, and/or 316 described below is for illustrative purposes, and is not intended to be limiting, as any of components 308, 310, 312, 314, and/or 316 may provide more or less functionality than is described. For example, one or more of components 308, 310, 312, 314, and/or 316 may be eliminated, and some or all of its functionality may be provided by other ones of components 308, 310, 312, 314, and/or 316. In one example, processor(s) 334 may be configured to execute one or more additional components that may perform some or all of the functionality attributed below to one of components 308, 310, 312, 314, and/or 316.

Figure 4:
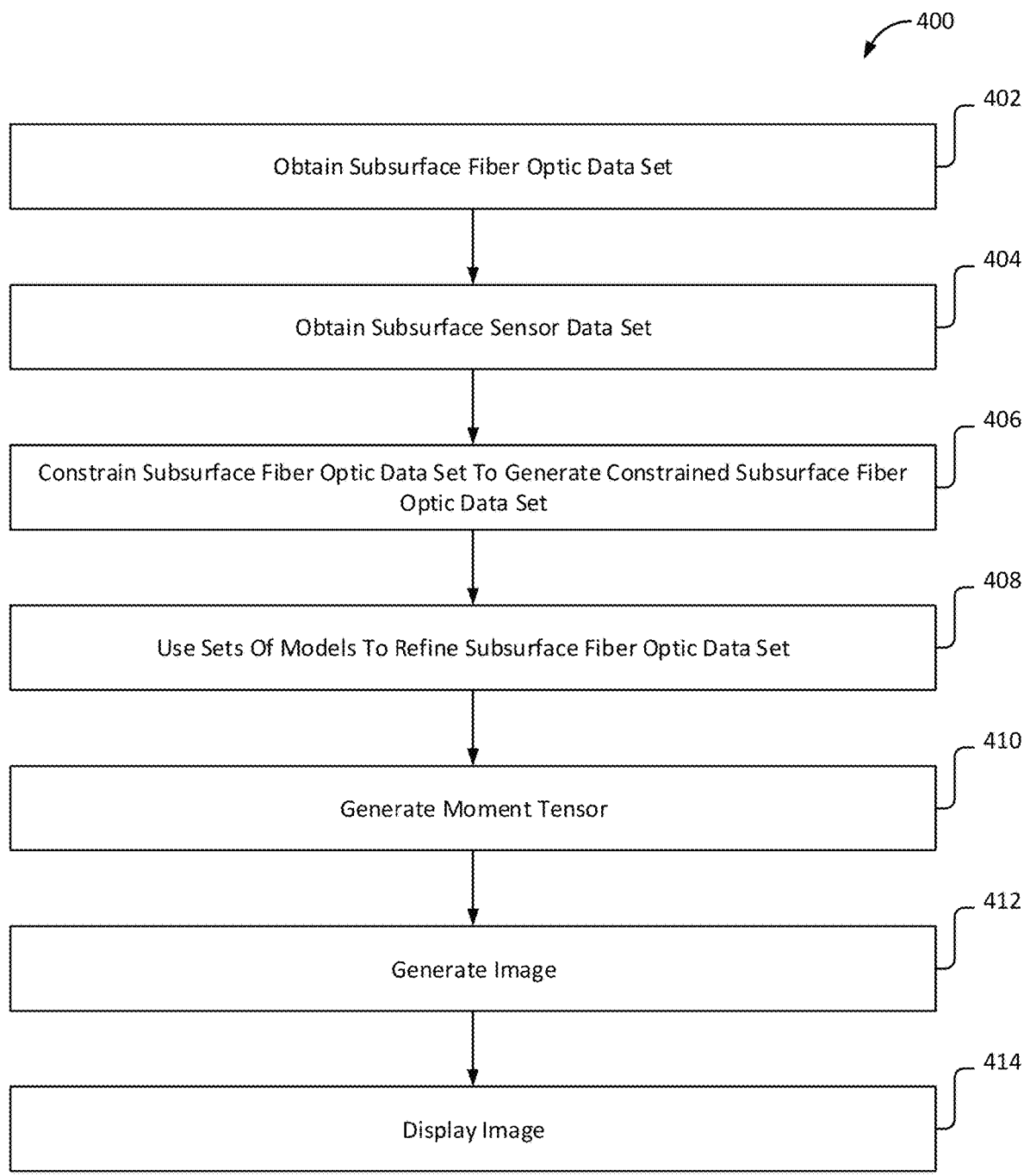
FIG. 4 illustrates a method for detecting a given subsurface event in a subsurface volume of interest, in accordance with one or more implementations.

FIG. 4 illustrates a method 400 for detecting a given subsurface event in a subsurface volume of interest, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

An operation 402 may include receiving a subsurface fiber optic data set. The subsurface fiber optic data set may correspond to the given subsurface event using a fiber optic apparatus. A given subsurface fiber optic data may specify parameter values of parameters as a function of position of the fiber optic apparatus located in the subsurface volume of interest. Operation 402 may be performed by one or more physical computer processors configured by machine-readable instructions including a component that is the same as or similar to fiber optic data component 308, in accordance with one or more implementations.

An operation 404 may include receiving a sensor data set. A given subsurface sensor data may specify parameter values of parameters as a function of position within the subsurface volume of interest. Operation 404 may be performed by one or more physical computer processors configured by machine-readable instructions including a component that is the same as or similar to sensor data component 310, in accordance with one or more implementations.

An operation 406 may include constraining the subsurface fiber optic data set to generate a constrained subsurface fiber optic data set. The subsurface fiber optic data set may be constrained based on a given parameter value of a given parameter within a certain range. Operation 406 may be performed by one or more physical computer processors configured by machine-readable instructions including a component that is the same as or similar to fiber optic data component 308, in accordance with one or more implementations.

An operation 408 may include using sets of models to refine the constrained subsurface fiber optic data set. The sets of models may represent stages of refining the constrained subsurface fiber optic data set. A first set of models may limit the constrained subsurface fiber optic data set and the second set of models may refine the limited subsurface fiber optic data set. The refined constrained subsurface fiber optic data set may be a refined subsurface fiber optic data set. In some implementations, operations 402-408 may be repeated to further refine event locations and origin times and to remove other false events. In implementations, shorter time windows and finer thresholding may be applied to improve accuracy. Operation 408 may be performed by one or more physical computer processors configured by machine-readable instructions including a component that is the same as or similar to model component 312, in accordance with one or more implementations.

An operation 410 may include generating a moment tensor. The moment tensor may be derived from the refined subsurface fiber optic data set and the sensor data set. Operation 410 may be performed by one or more physical computer processors configured by machine-readable instructions including a component that is the same as or similar to moment tensor component 314, in accordance with one or more implementations.

An operation 412 may include generating a digital seismic image. The digital seismic image may represent the moment tensor and the refined subsurface fiber optic data set using visual effects to depict at least a portion of the moment tensor and at least a portion of the parameter values in the refined subsurface fiber optic data set as a function of position within the subsurface volume of interest. Operation 412 may be performed by one or more physical computer processors configured by machine-readable instructions including a component that is the same as or similar to digital seismic image component 316, in accordance with one or more implementations.

An operation 414 may include displaying the digital seismic image on a graphical user interface. Operation 414 may be performed by one or more physical computer processors configured by machine-readable instructions including a component that is the same as or similar to digital seismic image component 316, in accordance with one or more implementations.

Figure 5:
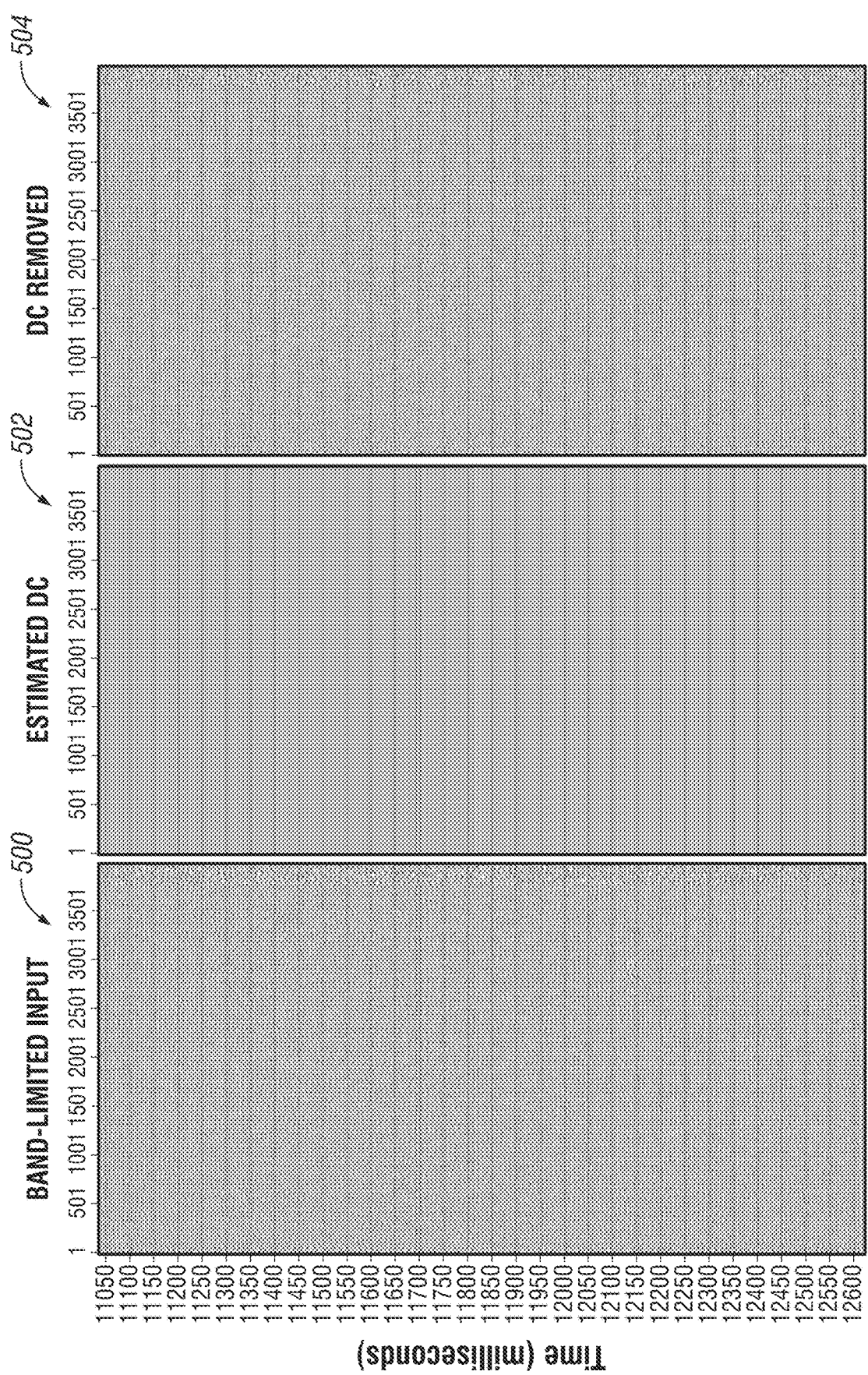
FIG. 5 illustrates DC effects filtered out, in accordance with one or more implementations.

FIG. 5 illustrates DC effects filtered out, in accordance with one or more implementations. As illustrated, DC noise may be estimated based on a duplication of the stack of the band-limited input. The estimated DC noise may be removed from the band-limited input using direct subtraction. 500 may illustrate the raw data. 502 may illustrate the estimated DC. 504 may illustrate the raw data with the DC effects filtered out.

Figure 6:
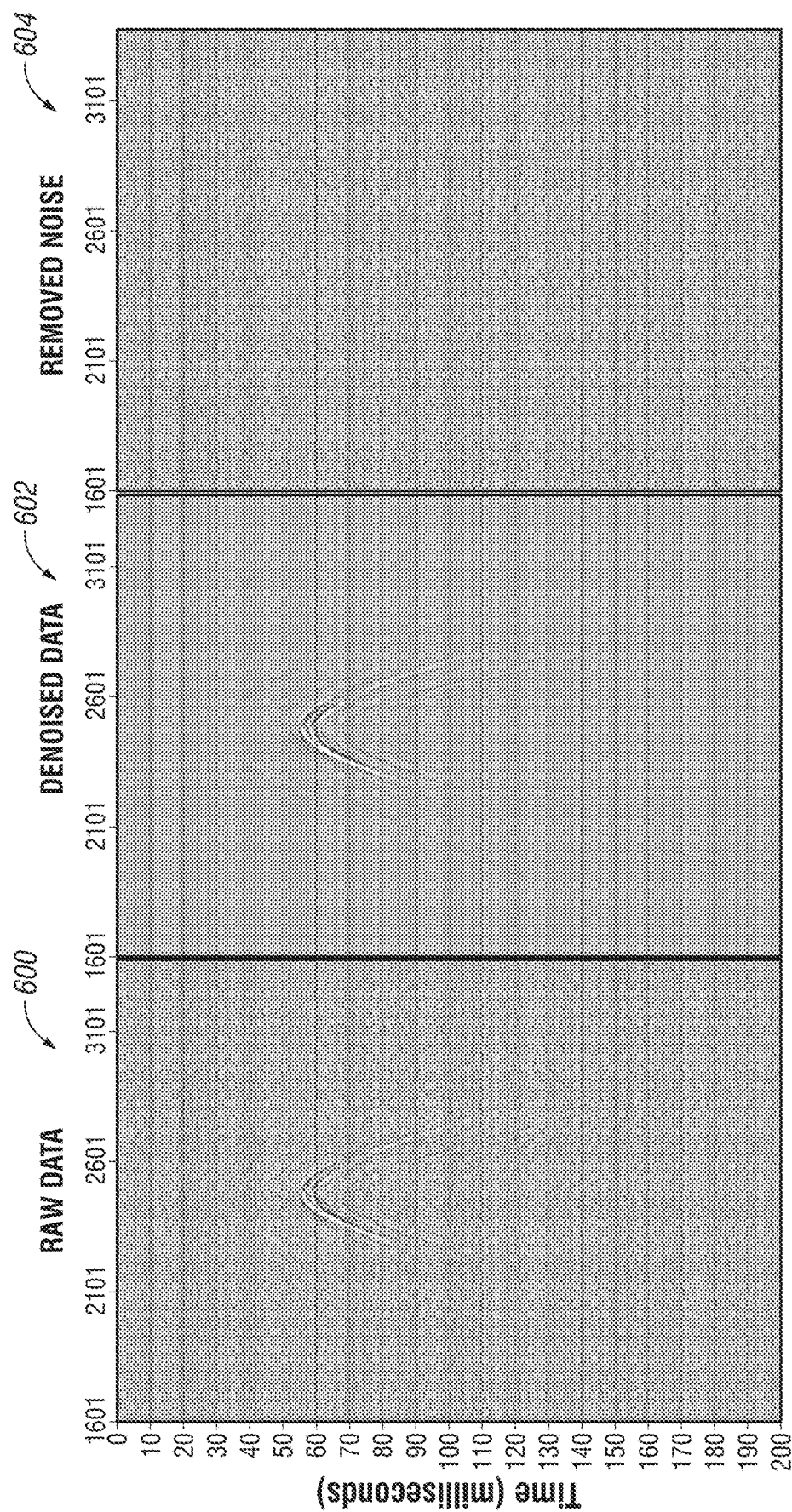
FIG. 6 illustrates raw data and denoised data, in accordance with one or more implementations.

FIG. 6 illustrates raw data and an example of processed data denoised by a machine-learning filter, in accordance with one or more implementations. 600 may illustrate raw data. 602 may illustrate denoised data. For example, the processed data may be denoised by a Wiener filter using machine learning. 604 may illustrate the noise that was removed in a denoising process.

Figure 7:
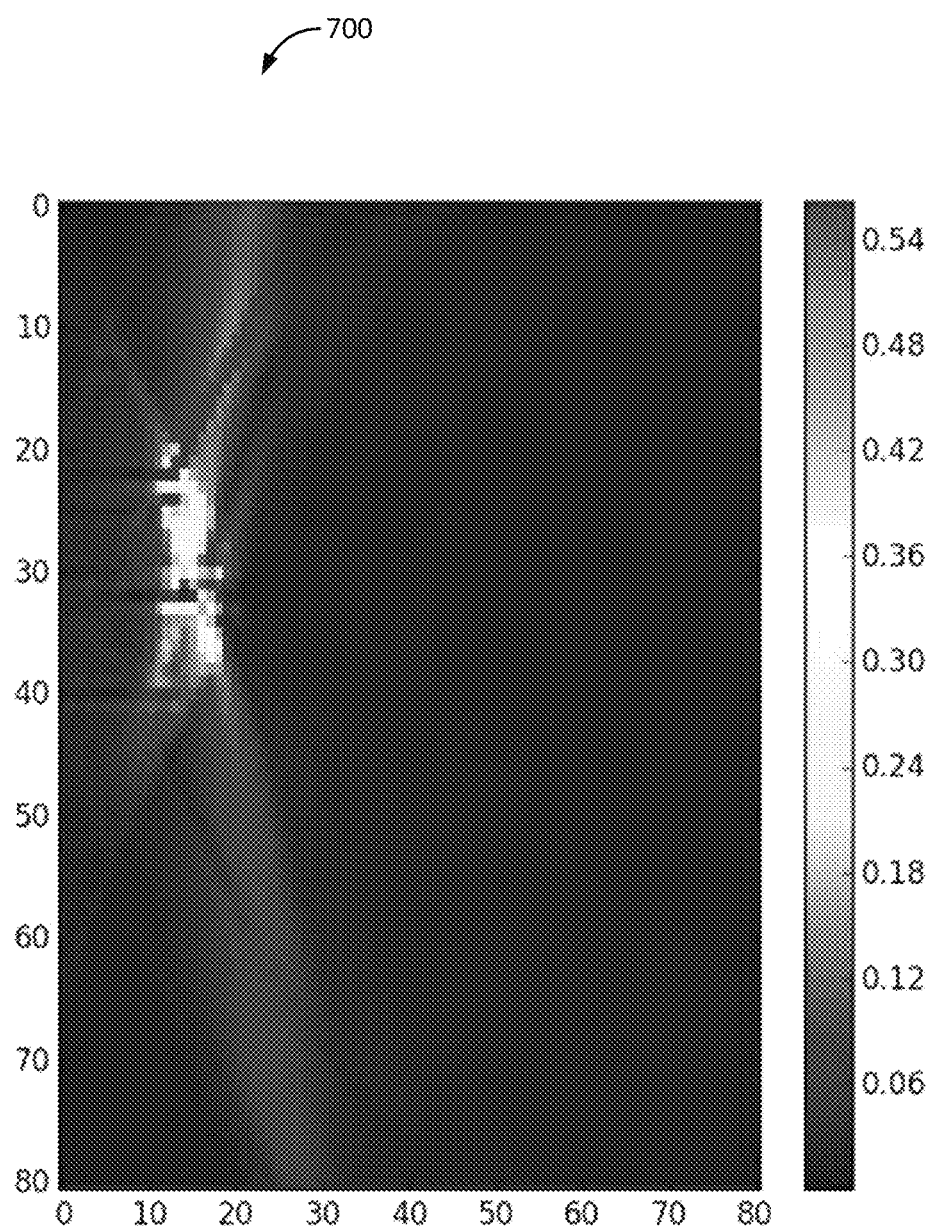
FIG. 7 illustrates an example spatial distribution of semblance values for a given origin time, in accordance with one or more implementations.

FIG. 7 illustrates an example probability map, in accordance with one or more implementations. As illustrated, the probability map 700 may depict the spatial distribution of semblance values for a given origin time. The probability map 700 may not be normalized.

Figure 8:
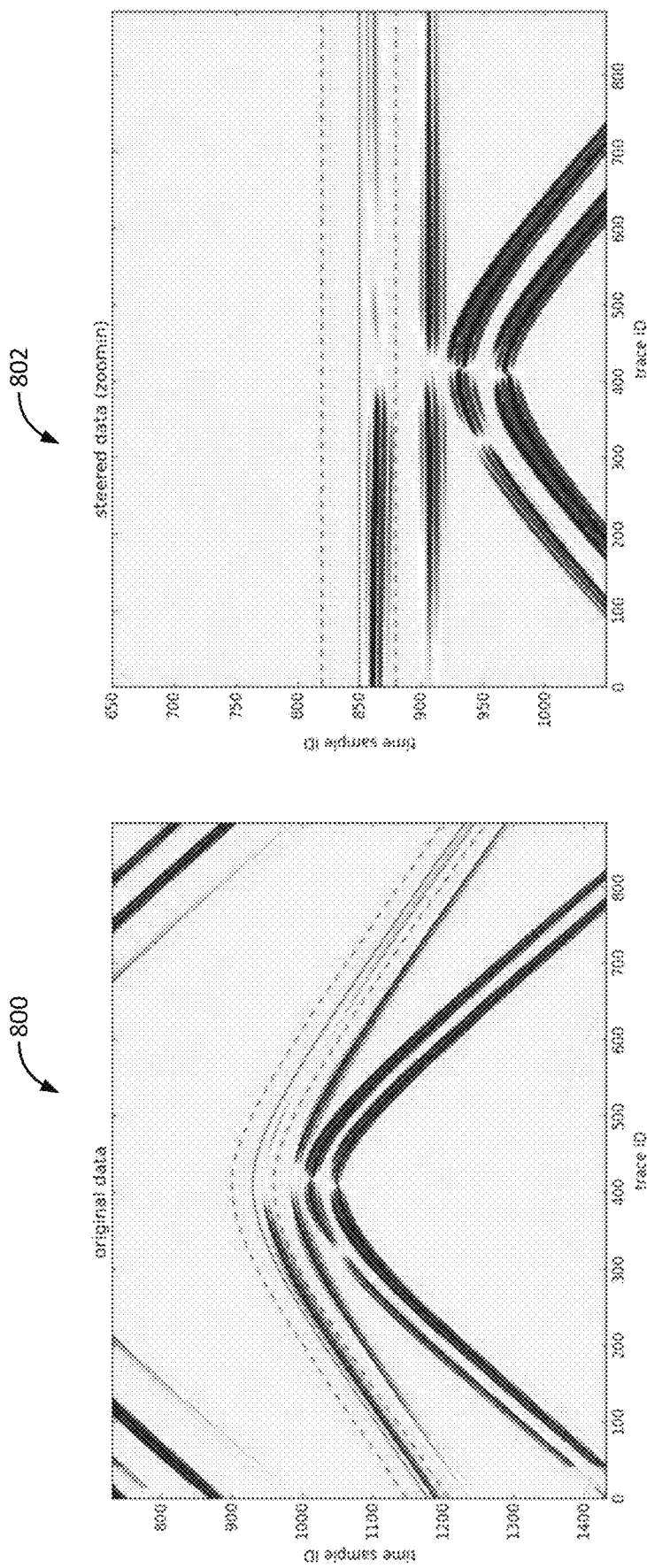
FIG. 8 illustrates original data and steered and flattened data of location and origin times of subsurface events, in accordance with one or more implementations.

FIG. 8 illustrates original data and steered and flattened data of location and origin times of subsurface events, in accordance with one or more implementations. As illustrated, the original data 800 may be steered and flattened to help isolate the location and origin times of subsurface events. Flatter data may indicate better location and origin time. As illustrated, the data is not completely flattened in the steered data 802 because the location and origin times are roughly estimated. A muting window, illustrated by the dotted lines, may help isolate a given subsurface event. This may help detect and remove false subsurface events, as well as avoid cross-talk between nearby events. For semblance analysis, a flatter curve may lead to a larger semblance value, while a less flat curve may correspond to a smaller semblance value.

Figure 9:
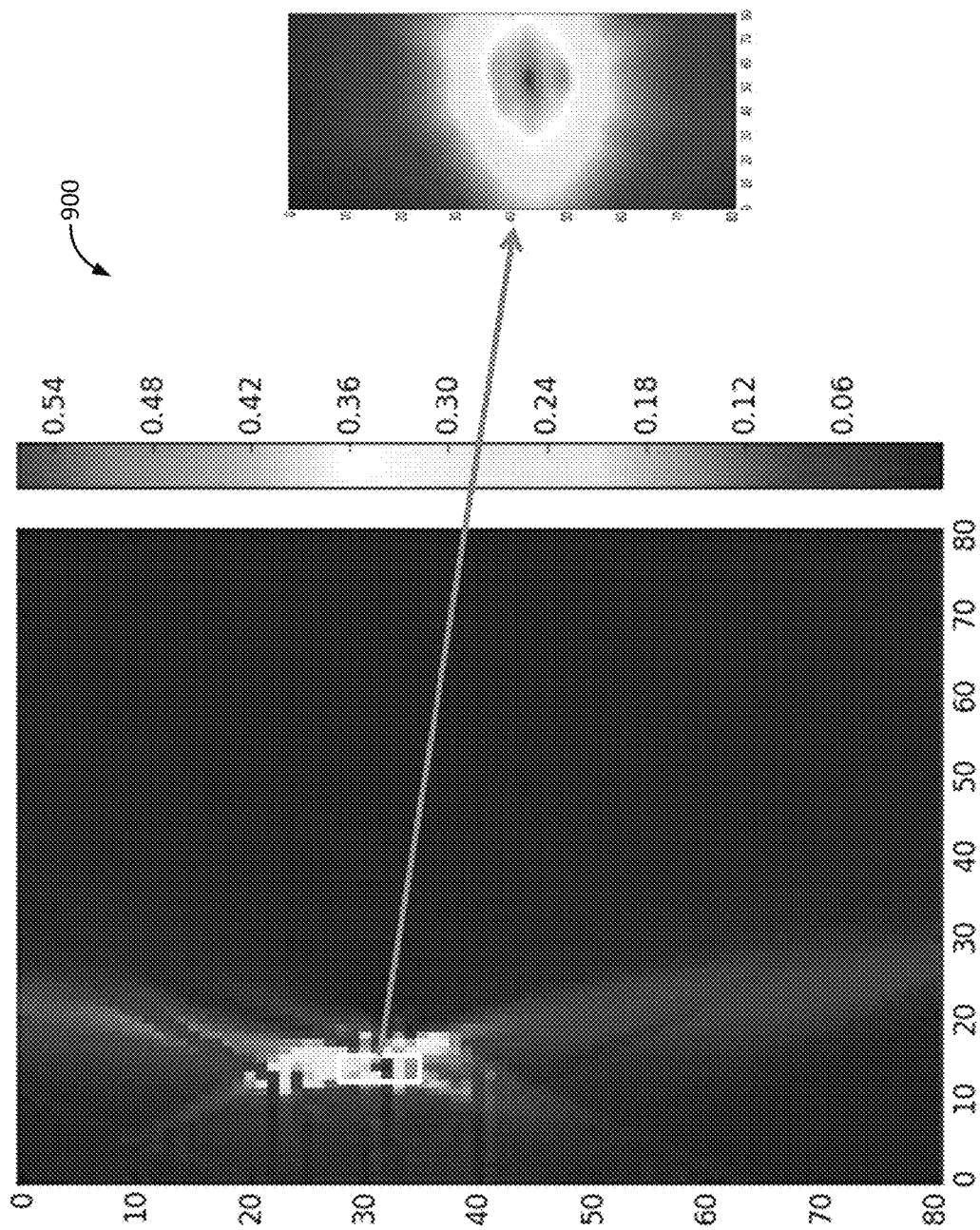
FIG. 9 illustrates a refined event location using a time reversal model, in accordance with one or more implementations.

FIG. 9 illustrates a refined event location using a time reversal model, in accordance with one or more implementations. As illustrated, using a time reversal model, map 900 illustrates a refined event location.

Figure 10:
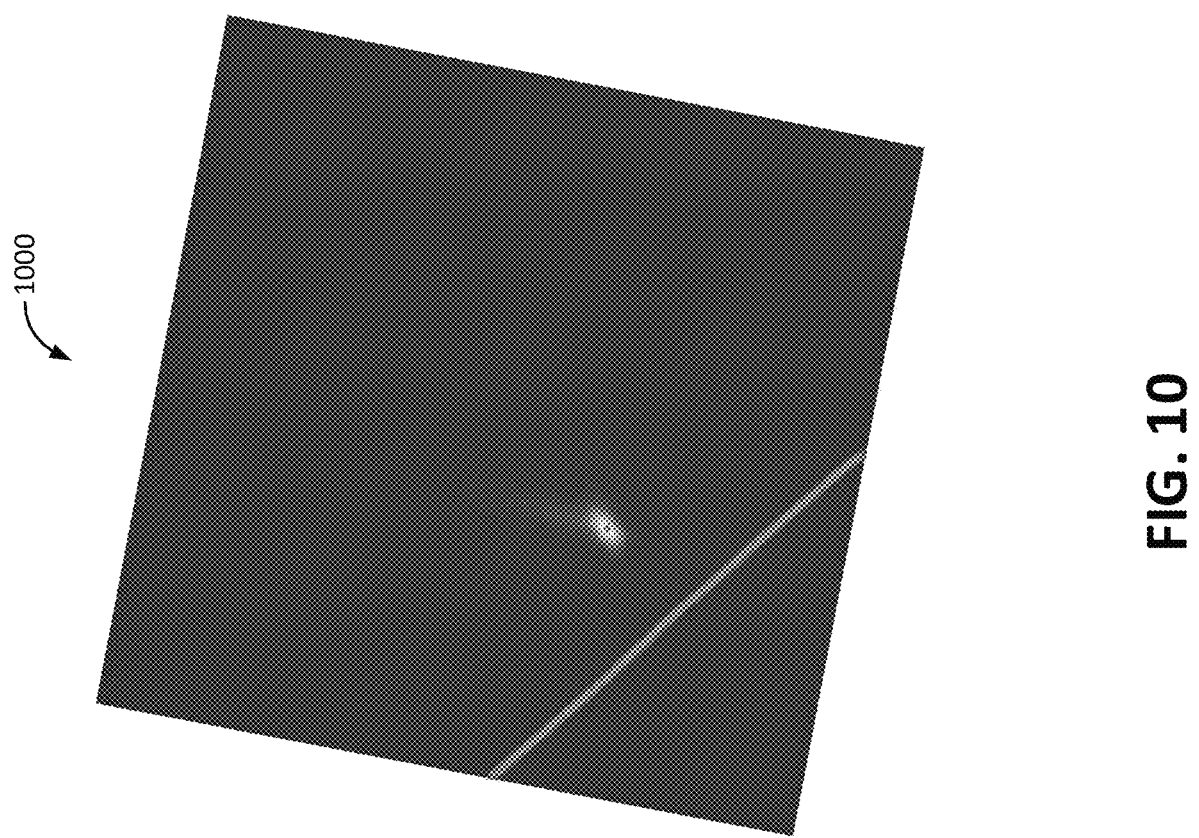
FIG. 10 illustrates high resolution interferometry imaging, in accordance with one or more implementations.

FIG. 10 illustrates high resolution interferometry imaging, in accordance with one or more implementations. As illustrated, high resolution interferometry imaging 1000 is a process of the presently disclosed technology.

Figure 11:
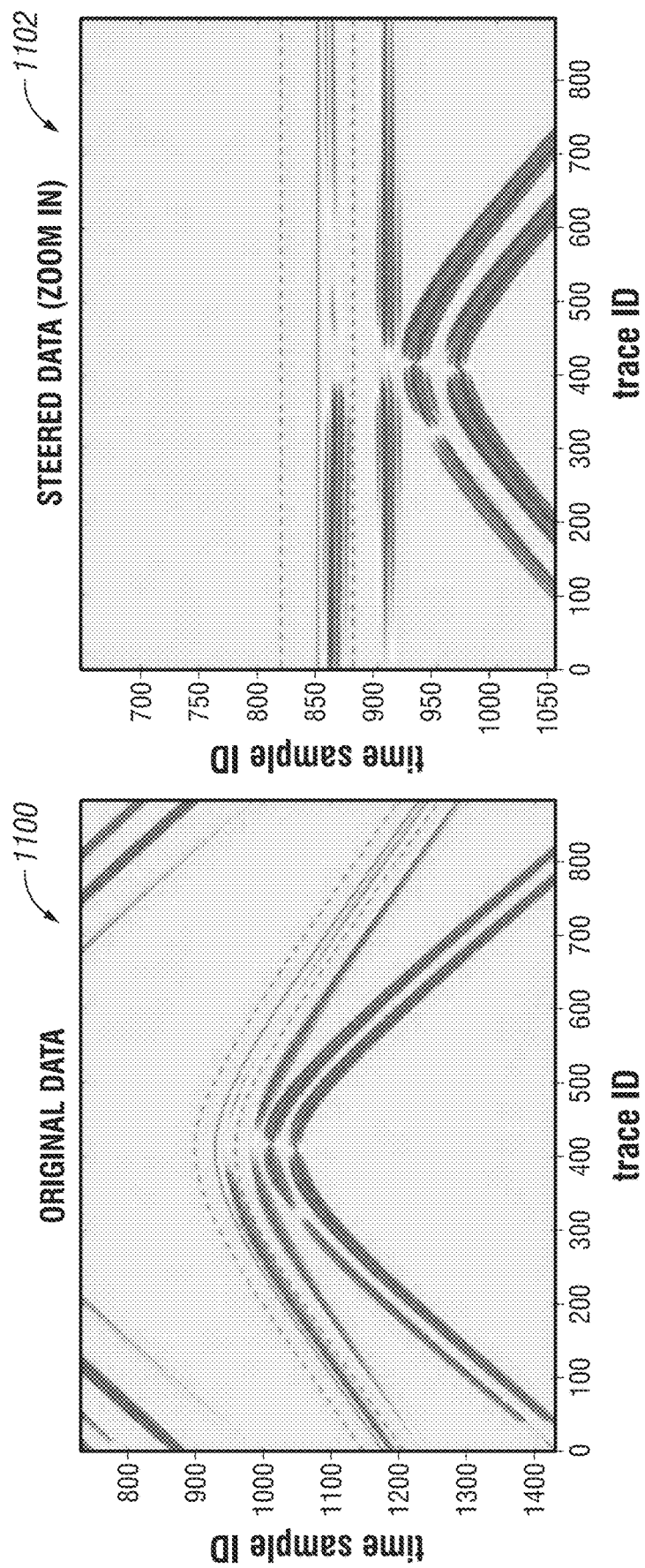
FIG. 11 illustrates original data and steered and flattened data of refined location and origin time of a subsurface event, in accordance with one or more implementations. Flatter steered data compared to FIG. 7 indicates more accurate location and origin time.

FIG. 11 illustrates original data 1100 and steered and flattened data 1102 of refined location and origin time of a subsurface event, in accordance with one or more implementations. As illustrated, the flattened data 1102 based on the refined location and origin time is much flatter than the data in FIG. 7, which indicates that the location and origin time are more accurate after refinement.

FIG. 12 illustrates a false-positive event candidate that may be caused by crosstalk between two true events close to each other, which can be removed based on a marching-pursue approach. As illustrated, when two subsurface events that lead to large semblance values are close to each other, both may be detected as subsurface events, in addition to a false-positive event candidate that results from crosstalk between the two true events. In order to remove the false-positive event candidate, a semblance value is generated for the real subsurface events. Even though the semblance value of the false-positive subsurface event candidate may be larger than a defined threshold, it is still less than semblance values of the real subsurface events. And hence a marching-pursue approach may be used to rule out the false-positive event candidate.

Figure 13:
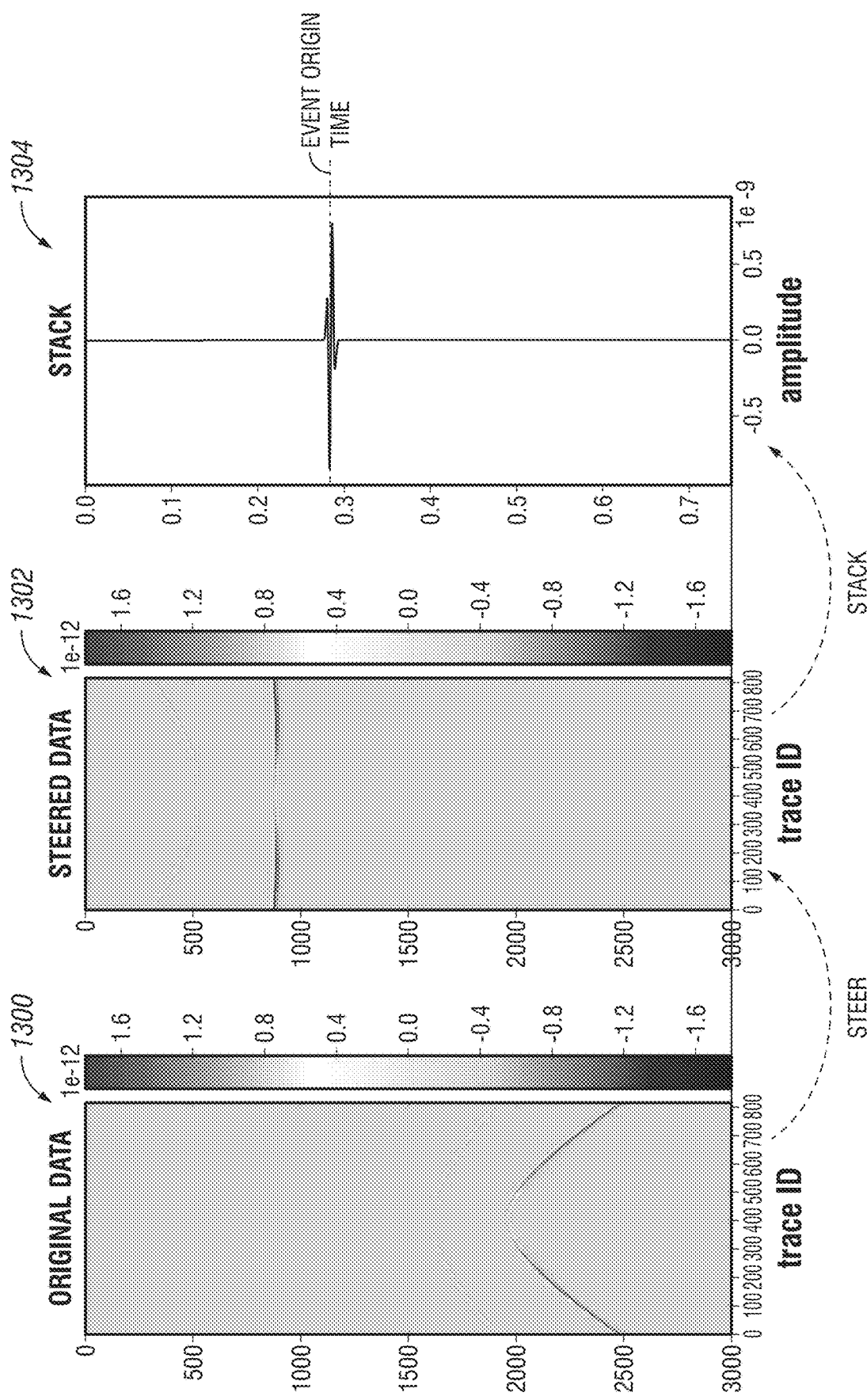
FIG. 13 illustrates raw data converted into steered data, which is then converted into stacked data to get event origin time, in accordance with one or more implementations.

FIG. 13 illustrates raw data converted into steered data, which is then converted into stacked data, in accordance with one or more implementations. As illustrated, the raw data 1300 may be steered based on a predicted traveltime curve. The steered data 1302 may flatten at the event origin time. Steering may include applying a normal moveout (NMO) correction and/or shifting the data as appropriate. NMO may describe the effect that the distance between a source and a sensor (the offset) has on the arrival time of a reflection in the form of an increase of time with offset, and NMO correction may correct such an effect. For example, NMO correction may account for hyperbolic characteristics of subsurface data, or other characteristics, due to the one or more sensors being located in positions away from the source of the subsurface event.

Shifting may include moving data based on a corresponding propagation time. For example, a sensor closer to the subsurface event may have a shorter propagation time while a sensor further away from the subsurface event may have a longer propagation time. Shifting may align the data as illustrated in the steered data window. As illustrated, a stack of the traces 1304 helps depict the event origin time based on the highest amplitude. Stacking may include adding the shifted traces together, such that the traces may add constructively to generate the signal in the stack window. In some implementations, time integration may be applied because the subsurface fiber optic data set may measure strain rate of particle movement, which is a time derivative of the strain. For a given trace, denoted as $w_t$ (the amplitude of the trace at time t), the time-integrated trace, denoted as $y_i$ (the amplitude of the trace at time i), may be defined and calculated as: $y_i = \Sigma_{t=0}^{i} w_t$.

Figure 14:
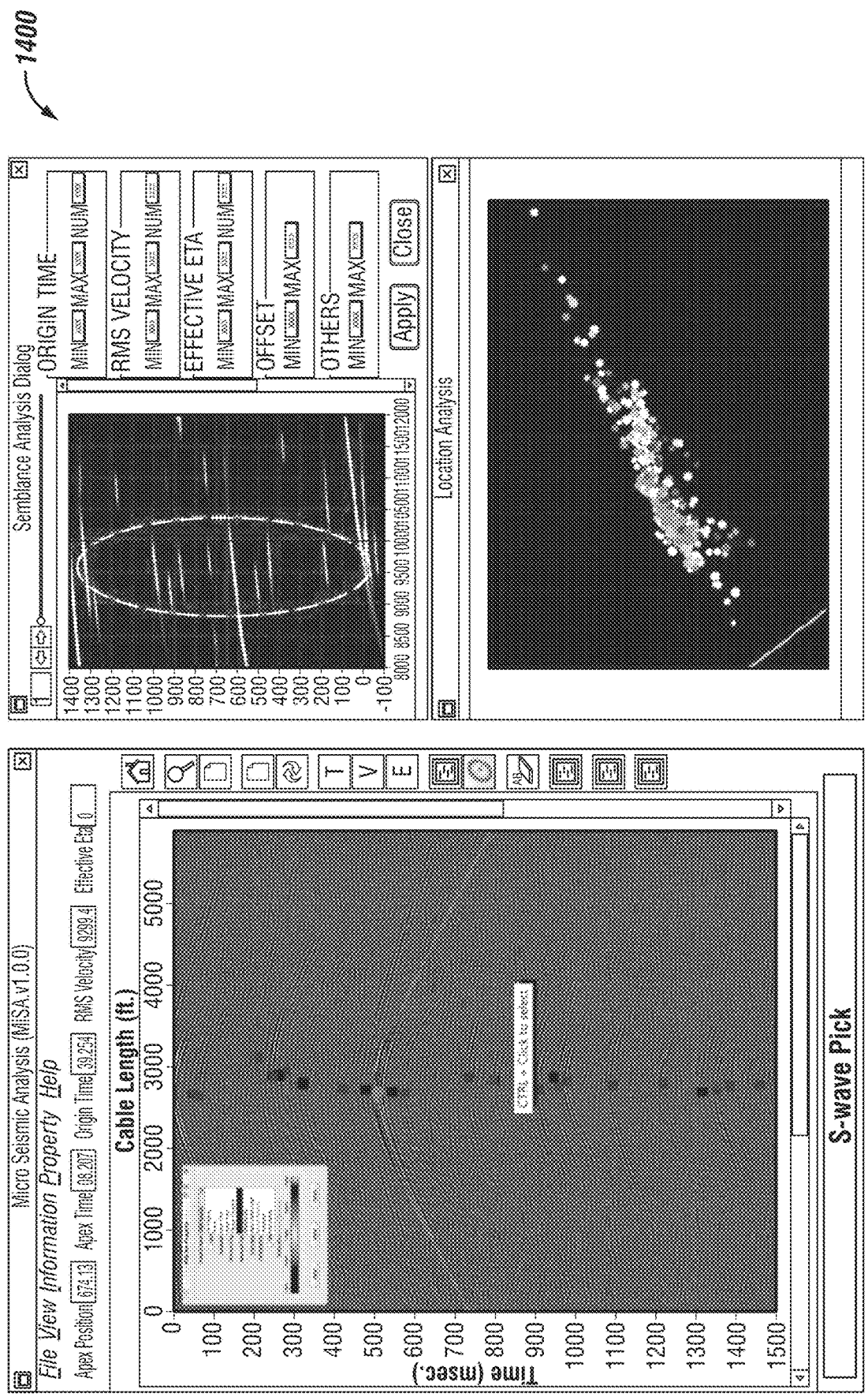
FIG. 14 illustrates a graphical user interface to visualize and analyze results, in accordance with one or more implementations.

FIG. 14 illustrates an example graphical user interface 1400 to visualize and analyze results, in accordance with one or more implementations. The example graphical user interface 1400 may include multiple tools to visualize and analyze the data and to add, remove or refine the events detected by the presently disclosed technology workflow. The graphical user interface 1400 may help a user focus on a particular attribute or parameter corresponding to the fiber optic data and the sensor data. As illustrated, the tools may estimate parameters, perform semblance analysis, perform velocity analysis, perform origin time analysis, perform location analysis, pick waves, select parameters to adjust, change data, look at, and adjust, the workflow, apply NMO, and/or other operations.

Figure 15:
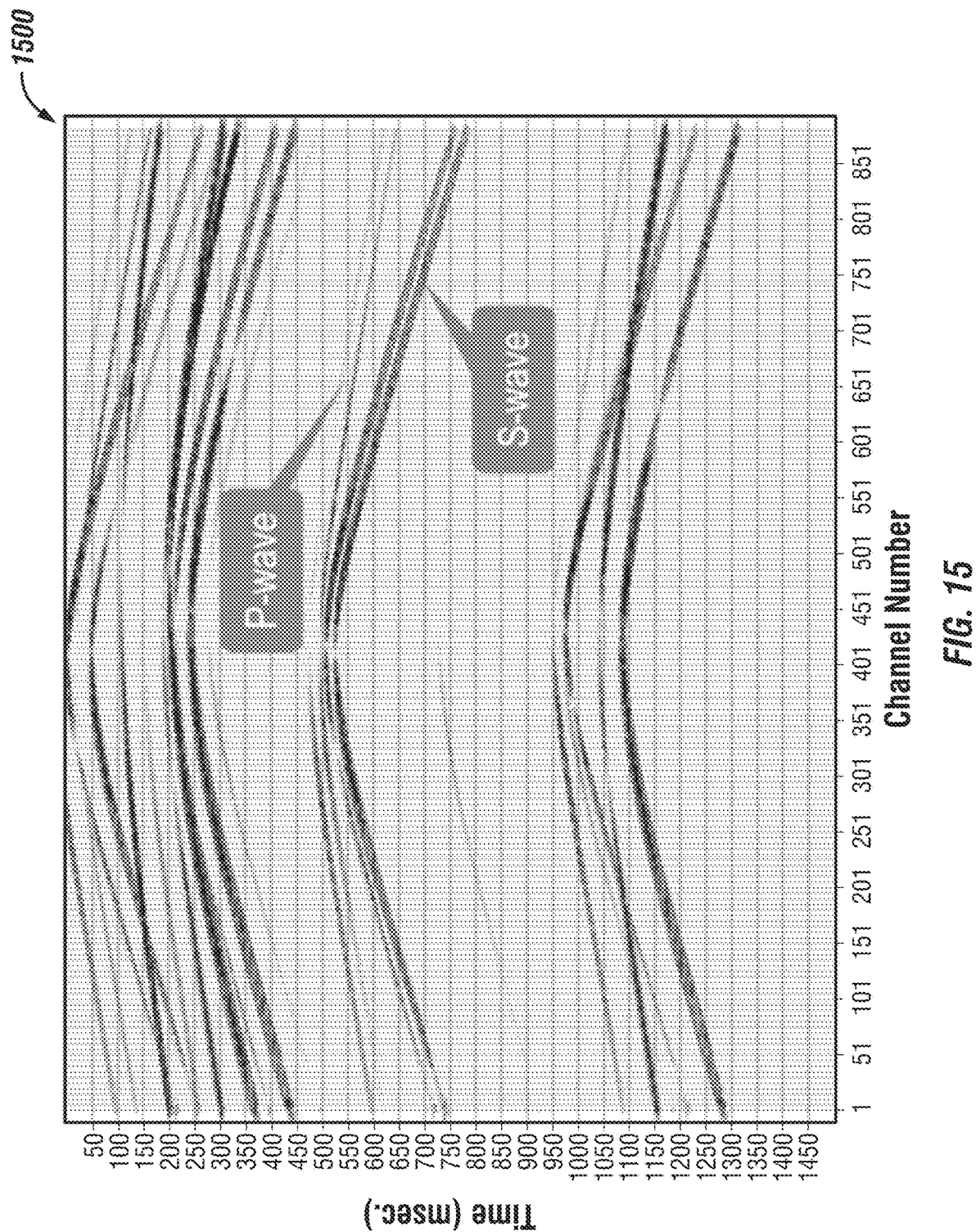
FIG. 15 illustrates synthetic data from multiple events, in accordance with one or more implementations.

FIG. 15 illustrates synthetic data from multiple events, in accordance with one or more implementations. The data 1500 comes from 12 events with varying amplitudes, locations, and origin times. As illustrated, both P waves and S waves are present in the data and are used as the input to generate FIGS. 16 & 17.

Figure 16:
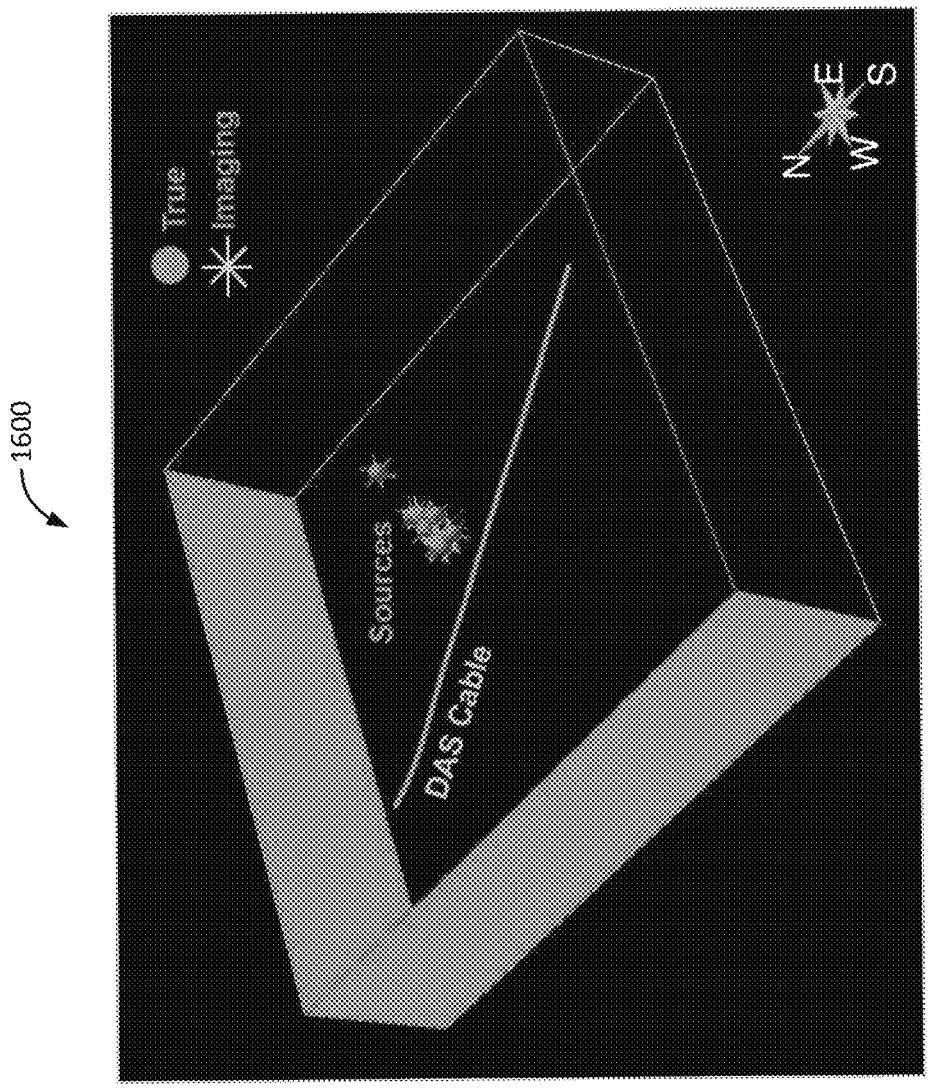
FIG. 16 illustrates the accuracy of estimated locations using a fiber optic apparatus, in accordance with one or more implementations.

FIG. 16 illustrates the accuracy of estimated locations using a fiber optic apparatus, in accordance with one or more implementations. As illustrated, a three-dimensional representation 1600 of the fiber optic apparatus and the estimated and actual locations is depicted. Location errors may be within 30 ft and origin time errors may be within 2 ms.

Figure 17:
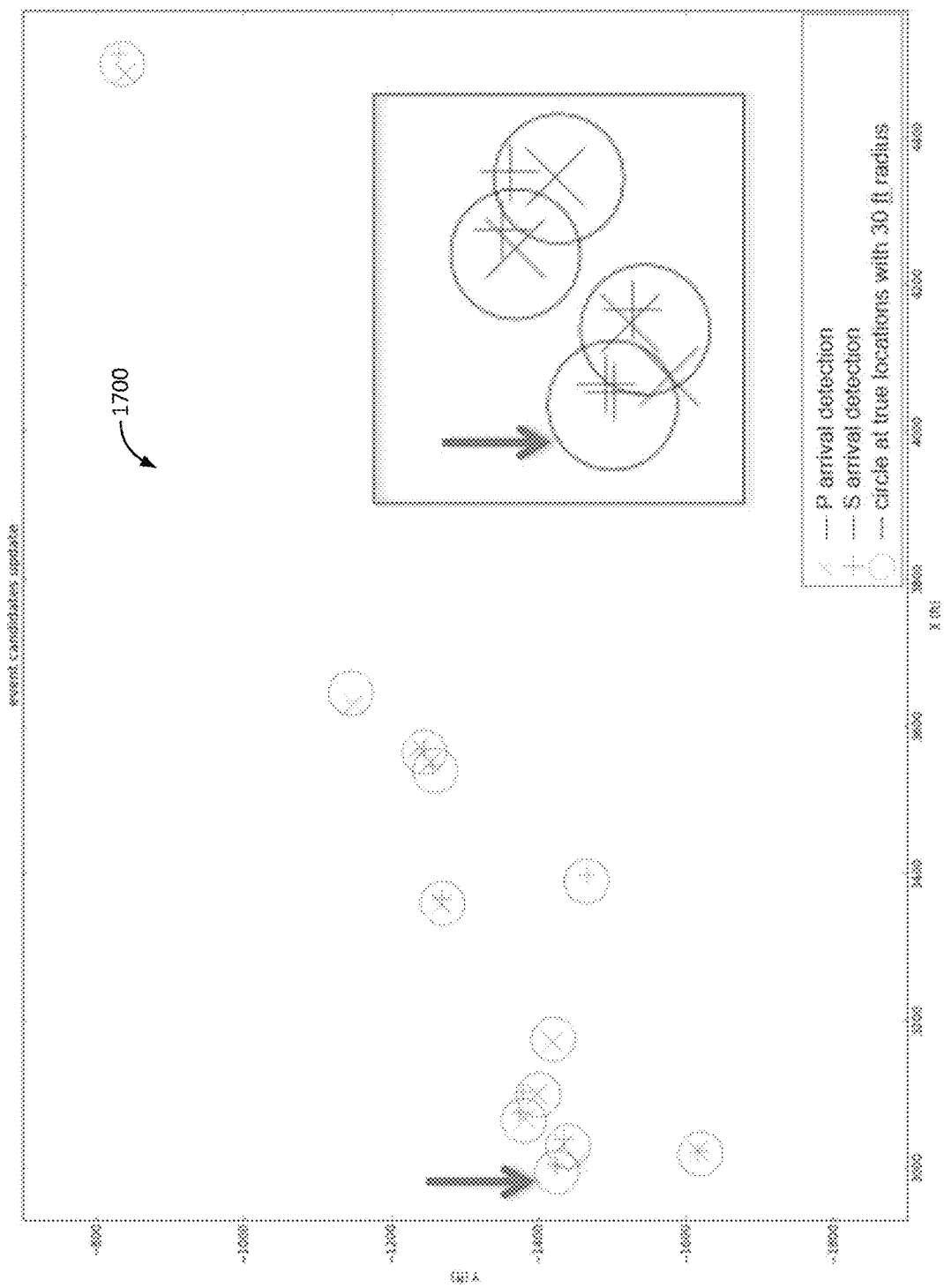
FIG. 17 illustrates a map view of the accuracy of estimated locations using a fiber optic apparatus, in accordance with one or more implementations.

FIG. 17 illustrates the accuracy of estimated locations using a fiber optic apparatus, in accordance with one or more implementations. As illustrated, a zoomed-in two-dimensional representation 1700 of the estimated and actual event locations is depicted. Detections may be removed that do not correspond to true events based on the visual representation. Otherwise, FIG. 17 may be substantially similar to FIG. 16.

Figure 18:
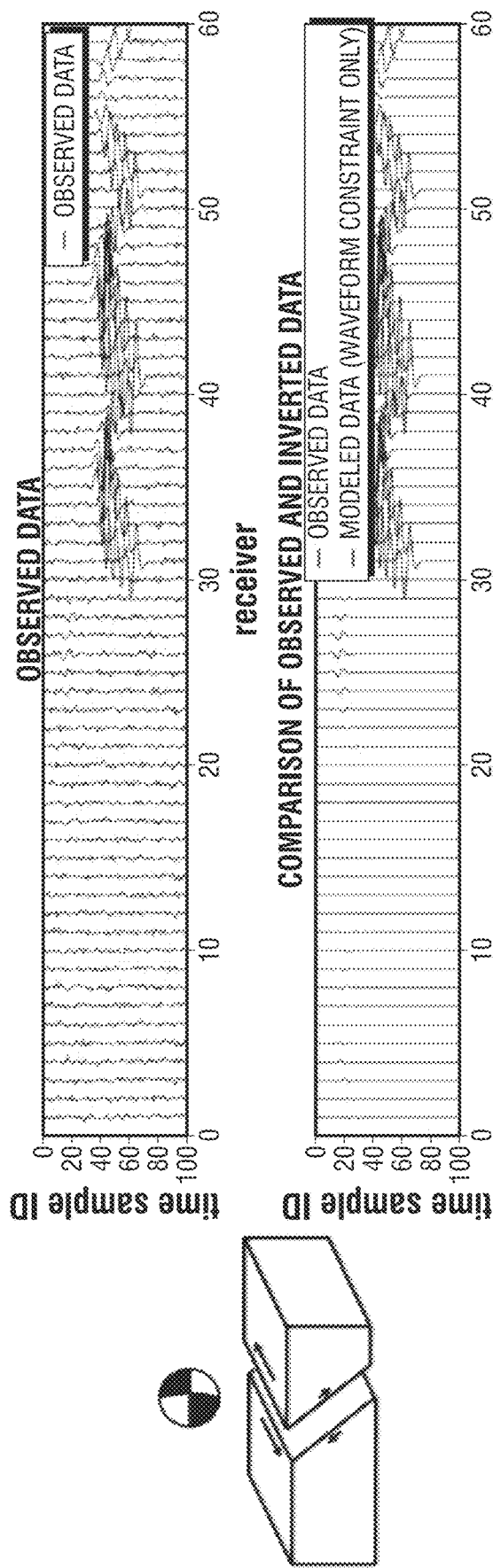
FIG. 18 illustrates relationship among moment tensor, fracture/fault plane and seismic data.

FIG. 18 illustrates a relationship among moment tensor, fracture/fault plane, and subsurface fiber optic data. Once a moment tensor is determined, a fracture/fault plane can be derived, together with corresponding relative movement between the hanging-wall and foot-wall of the fracture/fault, which could be dip-slip, strike-slip, and/or opening/closing. A dominantly strike-slip fault is depicted, with a corresponding moment tensor. In accordance with one or more implementations, the moment tensor can be accurately inverted by matching waveforms between observed data and modeled data. Comparisons between input and modeled data and between true moment tensor and inverted moment tensor are depicted as well.

Figure 19:
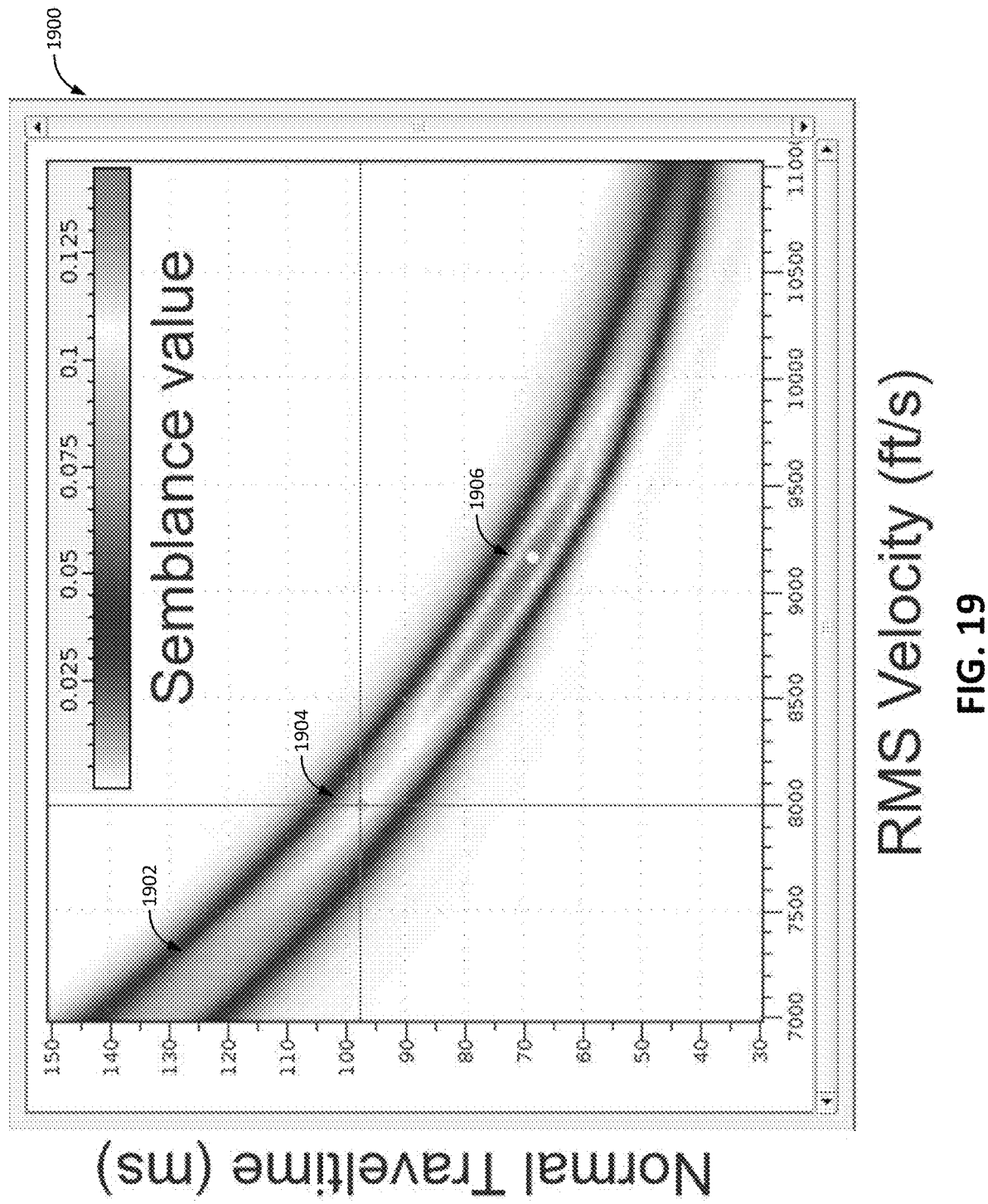
FIG. 19 illustrates an example graph of semblance values as a function of RMS velocities and normal traveltime, for a subsurface event, in accordance with one or more implementations.

FIG. 19 illustrates an example graph 1900 of semblance values as a function of RMS velocities and normal traveltime, for a subsurface event, in accordance with one or more implementations. Each pair of RMS velocity and normal traveltime, i.e., a colored point on the graph (white/red means small/large semblance values respectively, as indicated on the temperature bar), leads to a different traveltime curve in the subsurface fiber optic data set. The semblance value of the corresponding point may be calculated as defined above, after traveltime-based NMO correction or otherwise shifting correction. As illustrated, the high-semblance area 1902 represents possible RMS velocity and normal traveltime pairs that fit one subsurface event in the subsurface fiber optic data set. The point 1904 corresponds to an RMS velocity of about 8,000 ft/s and normal travel time of about 97 ms, leading to about a 0.1 semblance value. The approximate value of 8,000 ft/s may be preselected based on the typical speed of SH waves in the local geological setting. However, the point 1906, with RMS velocity of about 9,250 ft/s and normal travel time of about 77 ms, leads to a larger semblance value of about 0.15, which indicates RMS velocity of about 9,250 ft/s fits the subsurface event in the subsurface fiber optic data set better than the about 8,000 ft/s RMS velocity selected. As illustrated, a grid search of RMS velocity and normal traveltime pairs for each subsurface event candidate may provide ideal RMS velocities for subsurface events that account for different ray/propagation paths, which leads to more accurate event locations.

Figure 20A:
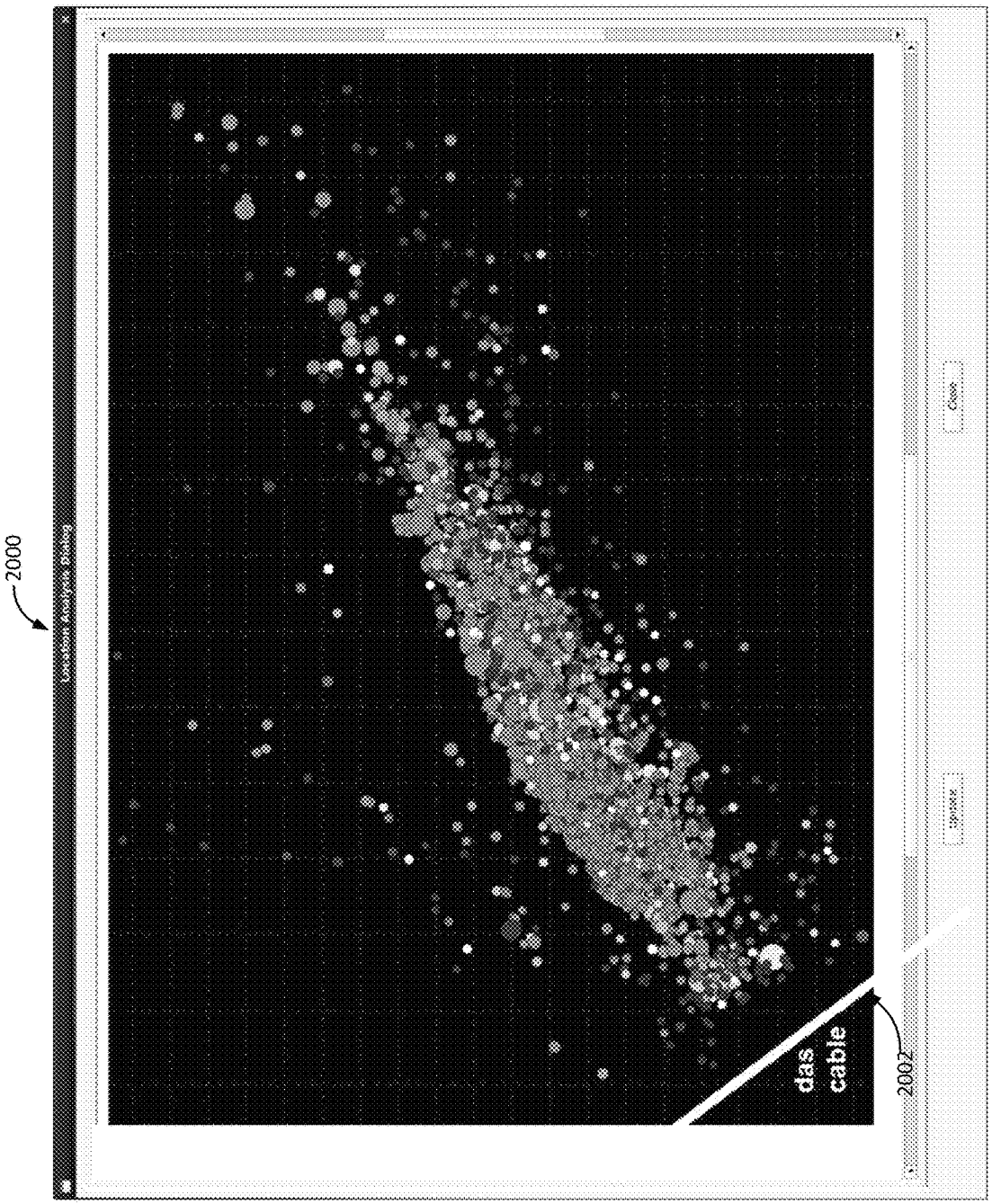
FIG. 20A illustrates an example interface displaying multiple event locations, in accordance with one or more implementations.

FIG. 20A illustrates an example interface 2000 displaying multiple event locations, in accordance with one or more implementations. As illustrated, the map 2000 may be a top-down view of a subsurface volume of interest. A DAS cable 2002 is illustrated in the bottom-left corner corresponding to its location in the subsurface volume of interest. The dots may represent locations of event candidates. Sizes of the dots may represent magnitudes of the event candidate (e.g., larger dots may have a greater magnitude while smaller dots have a smaller magnitude). Colors of the dots may represent corresponding semblance values (e.g., blue may correspond to lower semblance values, or less likely to be a subsurface event, while red dots have higher semblance values, or are more likely to be a subsurface event). The interface 2000 may allow a user to manually quality check the event candidates (i.e., remove likely false positives). The example interface 2000 may allow a user to select offset range changes, perform semblance calculations in a data domain, and display source event image area size. For example, a threshold semblance value of about 0.2 may be used to remove any event that has a smaller semblance value. The event image area size may be limited to less than about 30 ft along each direction, to remove any event that has a larger uncertainty. Those threshold values may depend on signal-to-noise ratios, the data quality, event distances from the fiber optic cable, event magnitudes and mechanisms, and thus may vary drastically for different scenarios and applications. A user may select a small portion of the events, look at their corresponding fits in the subsurface fiber optic data set, evaluate quality of the fits, and determine appropriate threshold values based on observations during this event filtering and selection process.

Figure 20B:
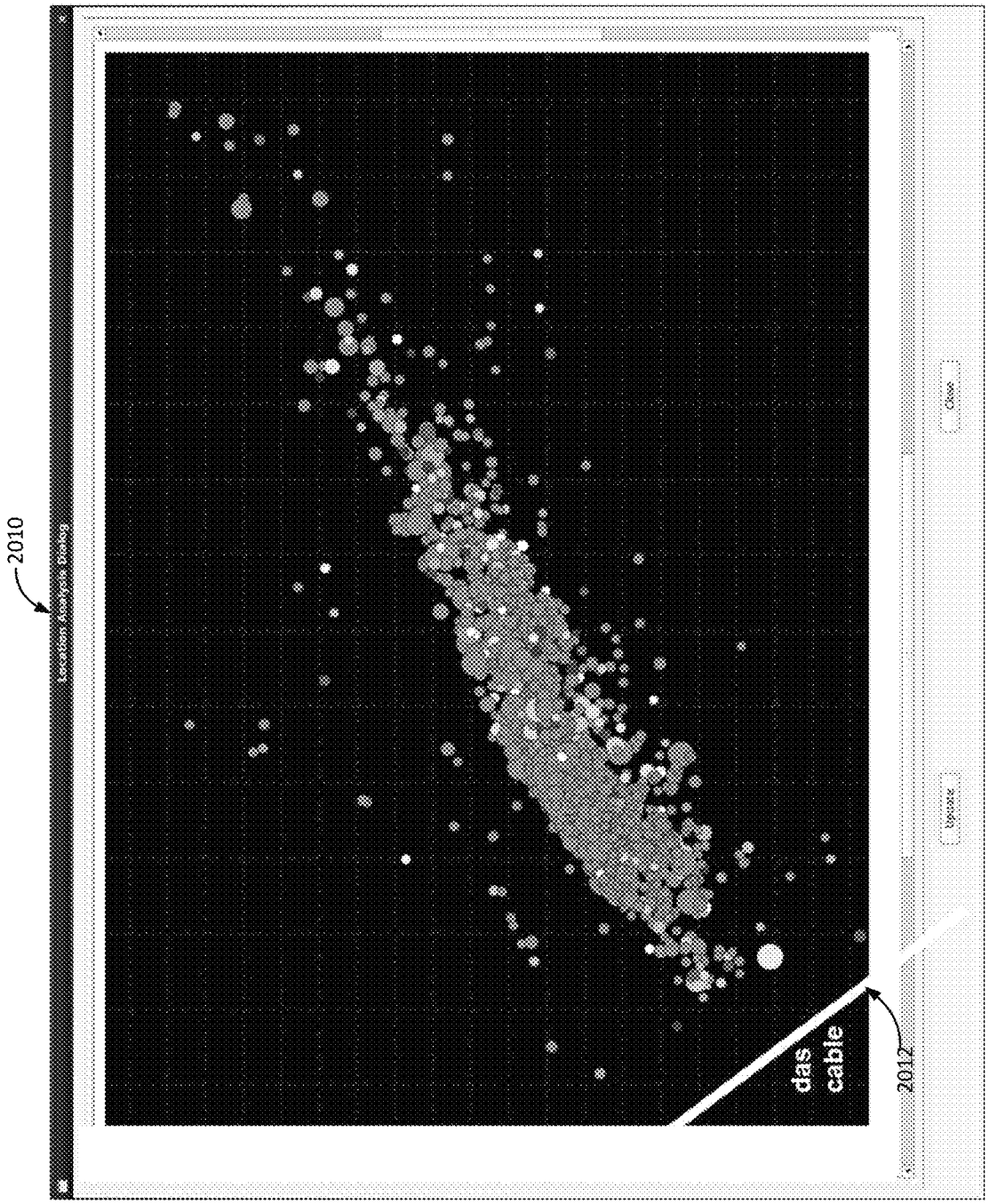
FIG. 20B illustrates an example interface displaying multiple event locations after event filtering and selection, in accordance with one or more implementations.

FIG. 20B illustrates an example interface 2010 displaying multiple event locations, after event filtering and selection, in accordance with one or more implementations. The map 2000 of FIG. 20B may be similar to the map 2010 in FIG. 20A described above. The map 2010 of FIG. 20B may be edited based on one or more factors. For example, editing or other quality control may be based on colors of the dots and/or size of the dots. In one example, all blue dots may be removed. In one example, dots that are smaller than a certain size threshold, or magnitude threshold, may be removed. In implementations, a combination of these factors may be used to edit the event candidates. For example, blue dots outside a radius of the center of concentrated red dots may be removed.

FIG. 21 illustrates example event candidates using a fiber optic apparatus and one or more geophones, in accordance with one or more implementations. As illustrated, a fiber optic apparatus 2101 may detect a subsurface event. A horizontally oriented fiber optic apparatus 2101 may be able to detect a subsurface event surrounding the center of a sensor on a 2D plane. Based on a homogeneous velocity model, or other simple velocity model, there may be a cylindrical symmetry around the sensor that detected the subsurface event. The entire circle 2110 may represent the event candidates based on the subsurface fiber optic data detected.

Leveraging the cylindrical symmetry of the subsurface fiber optic data, a refined location of the subsurface event may be determined using geophones 2102 (e.g., 1C surface geophone, 3C downhole geophones, etc.) and/or other sensors (e.g., additional fiber optic apparatuses oriented perpendicularly or in parallel). It should be appreciated that for more complex velocity models, there may not be a cylindrical symmetry and other shapes or curves may correspond to the complex velocity models. Semblance analysis may be applied to the circle 2110, or other appropriate shape, to determine the true event location. The location 2108 that corresponds to the highest semblance value will be the correct event location on the shape. Other locations 2104 and 2106 may illustrate example locations on the circle 2110 where geophone data or other sensor data was detected. It should be appreciated that if additional fiber optic apparatuses are deployed, additional circles may represent locations of potential subsurface events formed from the additional fiber optic apparatuses. These circles may intersect at a single point or at most two points for two fiber optic apparatuses. If there are two points of intersection, one of the two points may be easily removed as a false positive based on known drilling operations or other known events in the subsurface volume of interest.

Figure 22:
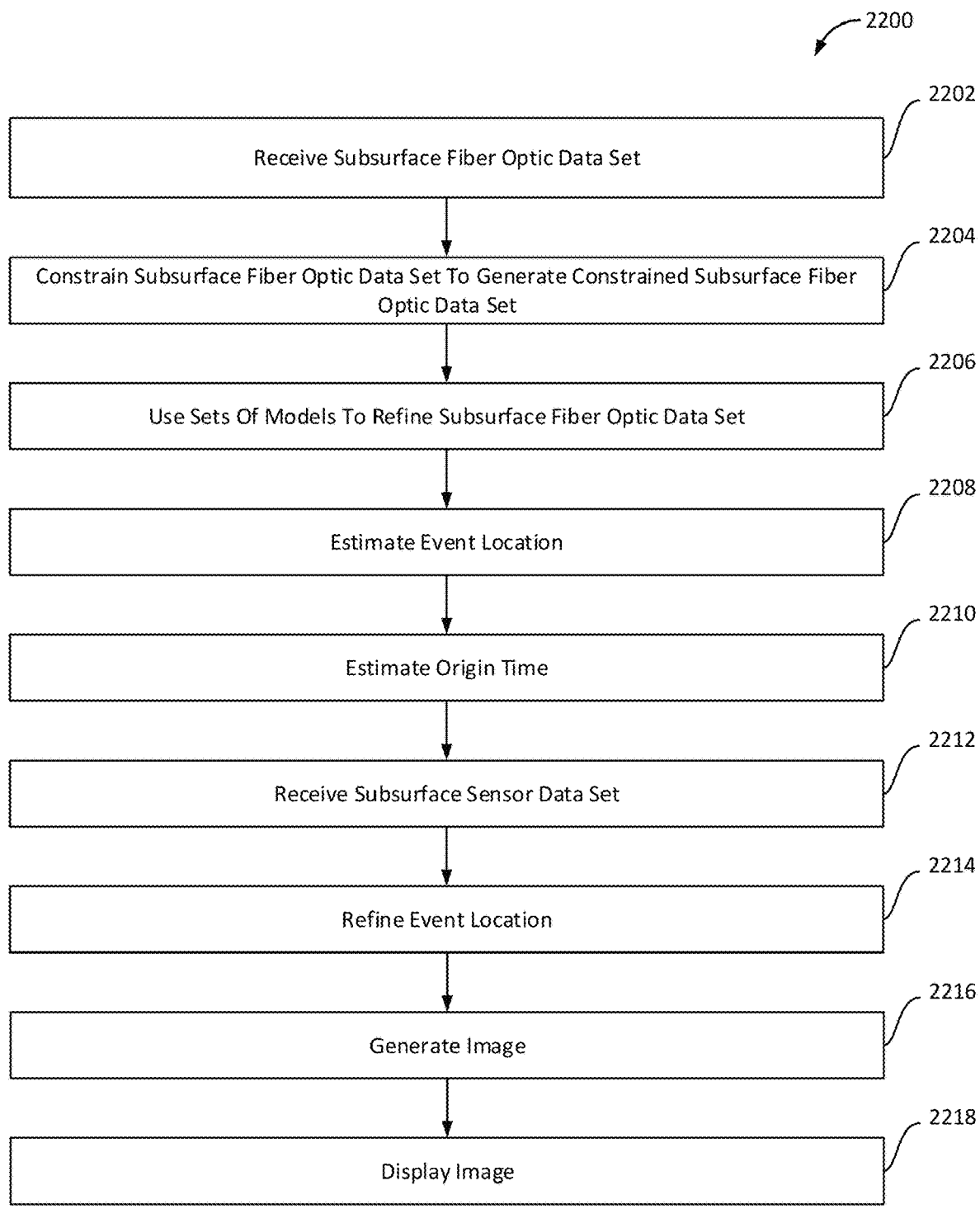
FIG. 22 illustrates an operational flowchart for detecting a given subsurface event in a subsurface volume of interest, in accordance with one or more implementations.

FIG. 22 illustrates a method 2200 for detecting a given subsurface event in a subsurface volume of interest, in accordance with one or more implementations. The operations of method 2200 presented below are intended to be illustrative. In some implementations, method 2200 may be accomplished with one or more additional operations not described, and/or without one or more of the operations discussed. Additionally, the order in which the operations of method 2200 are illustrated in FIG. 22 and described below is not intended to be limiting.

In some implementations, method 2200 may be implemented in one or more processing devices (e.g., a physical computer processor, a digital processor, an analog processor, a digital circuit designed to process information, an analog circuit designed to process information, a state machine, and/or other mechanisms for electronically processing information). The one or more processing devices may include one or more devices executing some or all of the operations of method 2200 in response to instructions stored electronically on an electronic storage medium. The one or more processing devices may include one or more devices configured through hardware, firmware, and/or software to be specifically designed for execution of one or more of the operations of method 2200.

An operation 2202 may include receiving a subsurface fiber optic data set. The subsurface fiber optic data set may correspond to the given subsurface event using a fiber optic apparatus. A given subsurface fiber optic data may specify parameter values of parameters as a function of position of the fiber optic apparatus located in the subsurface volume of interest. Operation 2202 may be performed by one or more physical computer processors configured by machine-readable instructions including a component that is the same as or similar to fiber optic data component 308, in accordance with one or more implementations.

An operation 2204 may include constraining the subsurface fiber optic data set to generate a constrained subsurface fiber optic data set. The subsurface fiber optic data set may be constrained based on a given parameter value of a given parameter within a certain range. Operation 2204 may be performed by one or more physical computer processors configured by machine-readable instructions including a component that is the same as or similar to fiber optic data component 308, in accordance with one or more implementations.

An operation 2206 may include using sets of models to refine the constrained subsurface fiber optic data set. The sets of models may represent stages of refining the constrained subsurface fiber optic data set. A first set of models may limit the constrained subsurface fiber optic data set and the second set of models may refine the limited subsurface fiber optic data set. The refined constrained subsurface fiber optic data set may be a refined subsurface fiber optic data set. In some implementations, operations 2202-2206 may be repeated to further refine event locations and origin times and to remove other false events. In implementations, shorter time windows and finer thresholding may be applied to improve accuracy. Operation 2206 may be performed by one or more physical computer processors configured by machine-readable instructions including a component that is the same as or similar to model component 312, in accordance with one or more implementations.

An operation 2208 may include estimating an event location. The estimated event location may be generated based on using the sets of models. In some implementations, applying the interferometry model to the subsurface fiber optic data sets, the limited subsurface fiber optic data set, and/or other data may generate a digital seismic image of locations of potential subsurface events, as described above. In implementations, a time reversal model may be used to generate an updated location. It should be appreciated, as described above, that these models may be compared using semblance analysis to initially refine potential location for the subsurface events. Operation 2208 may be performed by one or more physical computer processors configured by machine-readable instructions including a component that is the same as or similar to sensor data component 310, in accordance with one or more implementations.

An operation 2210 may include estimating an origin time. The origin time may be based on an arrival time and a propagation time. The propagation time may be based on a velocity model and an event location. Operation 2210 may be performed by one or more physical computer processors configured by machine-readable instructions including a component that is the same as or similar to fiber optic data component 308 and/or sensor data component 310, in accordance with one or more implementations.

An operation 2212 may include receiving a sensor data set. A given subsurface sensor data may specify parameter values of parameters as a function of position within the subsurface volume of interest. Operation 2212 may be performed by one or more physical computer processors configured by machine-readable instructions including a component that is the same as or similar to sensor data component 310, in accordance with one or more implementations.

An operation 2214 may include refining an event location. The refined event location may be based on the refined subsurface fiber optic data set and the sensor data set. As described above, the subsurface fiber optic data set may indicate that the refined event location is some distance away from a corresponding sensor. In implementations, these various distances may be equidistant from the corresponding sensor. The sensor data set may help specify from which direction the refined event location is located on the various distances away from the sensor. Semblance analysis may be applied to a stacked sensor data set to find a location that corresponds to the highest semblance value. Operation 2214 may be performed by one or more physical computer processors configured by machine-readable instructions including a component that is the same as or similar to sensor data component 310, in accordance with one or more implementations.

An operation 2216 may include generating a digital seismic image. The digital seismic image may represent the refined subsurface fiber optic data set using visual effects to depict at least a portion of the parameter values in the refined subsurface fiber optic data set and a portion of the parameter values in the sensor data set as a function of position within the subsurface volume of interest. Operation 2216 may be performed by one or more physical computer processors configured by machine-readable instructions including a component that is the same as or similar to digital seismic image component 316, in accordance with one or more implementations.

An operation 2218 may include displaying the digital seismic image on a graphical user interface. Operation 2218 may be performed by one or more physical computer processors configured by machine-readable instructions including a component that is the same as or similar to digital seismic image component 316, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method for detecting a given subsurface event in a subsurface volume of interest, the method comprising:
    receiving a subsurface fiber optic data set of the given subsurface event, wherein the subsurface fiber optic data set comprises responses detected by a fiber optic apparatus, and wherein a given subsurface fiber optic data set specifies parameter values of parameters as a function of position in the subsurface volume of interest;
    constraining the subsurface fiber optic data set based on a given parameter value of a given parameter within a certain range to generate a constrained subsurface fiber optic data set;
    using sets of models to refine the constrained subsurface fiber optic data set to generate a refined subsurface fiber optic data set;
    estimating an event location of the given subsurface event based on the refined subsurface fiber optic data set;
    estimating an origin time based on the event location;
    refining the limited subsurface fiber optic data set based on whether the event location using the interferometry model and the event location using the time reversal model are within a threshold spatial value to generate a refined subsurface fiber optic data set;
    applying the interferometry model to the limited subsurface fiber optic data set, wherein applying the interferometry model to the limited subsurface fiber optic data set comprises:
        binning the limited subsurface fiber optic data set;
        calculating cross-correlations between a reference subsurface fiber optic data and other subsurface fiber optic data set from the limited subsurface fiber optic data set;
        migrating traces to the given subsurface volume of interest based on a shift between the reference trace and the traces from the limited subsurface fiber optic data set to generate partial digital seismic images; and
        combining the partial digital seismic images to generate an updated location;
    applying the time reversal model to the limited subsurface fiber optic data set to estimate the event location; and
    refining the limited subsurface fiber optic data set based on whether the event location using the interferometry model and the event location using the time reversal model are within a threshold spatial value to generate a refined subsurface fiber optic data set.

2. The method of claim 1, further comprising:
    receiving a sensor data set of the given subsurface event, wherein the sensor data set comprises responses detected by a sensor, and wherein a given sensor data specifies parameter values of parameters as a function of position within the subsurface volume of interest; and refining the event location of the subsurface event using the sensor data set.

3. The method of claim 2, wherein refining the event location of the subsurface event using the sensor data set comprises:
identifying a set of potential locations based on the refined subsurface fiber optic data set;
deriving directionality from sensor data set based on polarization analysis, wherein the sensor data set comprises responses detected by a subsurface geophone; and
selecting a correct location among the set of potential locations using the refined subsurface fiber optic data set and the sensor data set.

4. The method of claim 2, wherein the sensor comprises one or more of a fiber optic apparatus or a geophone.

5. The method of claim 2, wherein the sensor data set is used to derive a wavespeed structure.

6. The computer-implemented method of claim 2, wherein refining the event location of the subsurface event using the sensor data set comprises:
identifying a set of potential locations based on the refined subsurface fiber optic data set;
deriving multiple location semblance values based on travel times to one or more sensors corresponding to the sensor data set, wherein the sensor data set comprises responses detected by a surface geophone; and
refining the event location from the set of potential locations based on one of the multiple location semblance values.

7. The method of claim 2, further comprising:
generating a digital seismic image that represents the refined subsurface fiber optic data set using visual effects to depict at least a portion of the parameter values in the refined subsurface fiber optic data set and at least a portion of the parameter values in the sensor data set as a function of position within the subsurface volume of interest; and
displaying the digital seismic image on a graphical user interface.

8. The method of claim 1, wherein the fiber optic apparatus forms a distributed acoustic sensing cable.

9. The method of claim 1, wherein a first set of models comprises:
a multiple signal classification model, and
a semblance-based model.

10. The method of claim 9, further comprising:
generating sets of probability maps of a given subsurface event by applying the first set of models to the constrained subsurface fiber optic data sets, wherein a given set of probability maps comprises a first probability map based on applying the multiple signal classification model and a second probability map based on applying the semblance-based model;
limiting the constrained subsurface fiber optic data set based on whether a semblance value of the given set of probability maps surpasses a threshold semblance value to generate a limited subsurface fiber optic data set.

11. The method of claim 1, wherein a second set of models comprises:
an interferometry model; and
a time reversal model.

12. The method of claim 1, further comprising determining whether semblance values of the refined subsurface fiber optic data set surpasses a refined threshold value.

13. The method of claim 1, wherein an origin time may be updated by applying one or more of the subsurface fiber optic data set, the constrained subsurface fiber optic data set, and the refined subsurface fiber optic data set.

14. The method of claim 1, wherein estimating an origin time based on the event location comprises:
obtaining a velocity model; and
estimating an origin time based on arrival times corresponding to the refined subsurface fiber optic data set and propagation times based on the velocity model and the event location.

15. The method of claim 14, wherein the velocity model is based on well data.

16. The method of claim 14, wherein the origin time is a given arrival time minus a corresponding propagation time.

17. A system for detecting a given subsurface event in a subsurface volume of interest, the system comprising:
electronic storage;
one or more physical computer processors configured by machine readable instructions to:
receive a subsurface fiber optic data set of the given subsurface event, wherein the subsurface fiber optic data set comprises responses detected by a fiber optic apparatus, and wherein a given subsurface fiber optic data specifies parameter values of parameters as a function of position in the subsurface volume of interest;
constrain the subsurface fiber optic data set based on a given parameter value of a given parameter within a certain range to generate a constrained subsurface fiber optic data set;
use sets of models to refine the constrained subsurface fiber optic data set to generate a refined subsurface fiber optic data set;
estimate an event location of the given subsurface event based on the refined subsurface fiber optic data set; and
estimate an origin time based on the event location;
apply the interferometry model to the limited subsurface fiber optic data set, wherein applying the interferometry model to the limited subsurface fiber optic data set comprises:
binning the limited subsurface fiber optic data set;
calculating cross-correlations between a reference subsurface fiber optic data and other subsurface fiber optic data set from the limited subsurface fiber optic data set;
migrating traces to the given subsurface volume of interest based on a shift between the reference trace and the traces from the limited subsurface fiber optic data set to generate partial digital seismic images; and
combining the partial digital seismic images to generate an updated location;
applying the time reversal model to the limited subsurface fiber optic data set to estimate the event location; and
refining the limited subsurface fiber optic data set based on whether the event location using the interferometry model and the event location using the time reversal model are within a threshold spatial value to generate a refined subsurface fiber optic data set.

18. The system of claim 17, wherein the one or more physical computer processors are further configured by machine readable instructions to:

receive a sensor data set of the given subsurface event, wherein the sensor data set comprises responses detected by a sensor, and wherein a given sensor data specifies parameter values of parameters as a function of position within the subsurface volume of interest; and refine the event location of the subsurface event using the sensor data set.

19. A non-transitory computer readable medium including instructions that, when executed by one or more physical computer processors, cause the one or more physical computer processors to refine estimated effects of parameters on amplitudes by performing the steps of:

receiving a subsurface fiber optic data set of a given subsurface event, wherein the subsurface fiber optic data set comprises responses detected by a fiber optic apparatus, and wherein a given subsurface fiber optic data specifies parameter values of parameters as a function of position in a subsurface volume of interest;

constraining the subsurface fiber optic data set based on a given parameter value of a given parameter within a certain range to generate a constrained subsurface fiber optic data set;

using sets of models to refine the constrained subsurface fiber optic data set to generate a refined subsurface fiber optic data set;

estimating an event location of the given subsurface event based on the refined subsurface fiber optic data set; and estimating an origin time based on the event location;

applying the interferometry model to the limited subsurface fiber optic data set, wherein applying the interferometry model to the limited subsurface fiber optic data set comprises:

binning the limited subsurface fiber optic data set;

calculating cross-correlations between a reference subsurface fiber optic data and other subsurface fiber optic data set from the limited subsurface fiber optic data set;

migrating traces to the given subsurface volume of interest based on a shift between the reference trace and the traces from the limited subsurface fiber optic data set to generate partial digital seismic images; and combining the partial digital seismic images to generate an updated location;

applying the time reversal model to the limited subsurface fiber optic data set to estimate the event location; and refining the limited subsurface fiber optic data set based on whether the event location using the interferometry model and the event location using the time reversal model are within a threshold spatial value to generate a refined subsurface fiber optic data set.

20. A method for detecting a given subsurface event in a subsurface volume of interest, the method comprising:

receiving a subsurface fiber optic data set of the given subsurface event, wherein the subsurface fiber optic data set comprises responses detected by a fiber optic apparatus, and wherein a given subsurface fiber optic data set specifies parameter values of parameters as a function of position in the subsurface volume of interest;

constraining the subsurface fiber optic data set based on a given parameter value of a given parameter within a certain range to generate a constrained subsurface fiber optic data set;

using sets of models to refine the constrained subsurface fiber optic data set to generate a refined subsurface fiber optic data set;

estimating an event location of the given subsurface event based on the refined subsurface fiber optic data set;

estimating an origin time based on the event location;

refining the limited subsurface fiber optic data set based on whether the event location using an interferometry model and the event location using a time reversal model are within a threshold spatial value to generate a refined subsurface fiber optic data set;

applying the interferometry model to the limited subsurface fiber optic data set, wherein applying the interferometry model to the limited subsurface fiber optic data set comprises refining the limited subsurface fiber optic data set based on whether the event location using the interferometry model and the event location using a time reversal model are within a threshold spatial value to generate a refined subsurface fiber optic data set.

* * * * *